United States Patent
Norling et al.

(10) Patent No.: US 8,374,306 B2
(45) Date of Patent: Feb. 12, 2013

(54) ISOTOPE PRODUCTION SYSTEM WITH SEPARATED SHIELDING

(75) Inventors: Jonas Norling, Uppsala (SE); Tomas Ericksson, Uppsala (SE)

(73) Assignee: General Electric Company, Schenectady, NY (US)

(*) Notice: Subject to any disclaimer, the term of this patent is extended or adjusted under 35 U.S.C. 154(b) by 664 days.

(21) Appl. No.: 12/492,200

(22) Filed: Jun. 26, 2009

(65) Prior Publication Data

US 2010/0329406 A1 Dec. 30, 2010

(51) Int. Cl.
*G21G 1/10* (2006.01)
*H05H 13/00* (2006.01)
*G21K 5/04* (2006.01)
*G21K 5/08* (2006.01)

(52) U.S. Cl. .................. 376/190; 315/502; 250/492.3
(58) Field of Classification Search .................. None
See application file for complete search history.

(56) References Cited

U.S. PATENT DOCUMENTS

| | | |
|---|---|---|
| 2,713,635 A | 7/1955 | Weissenberg et al. |
| 2,872,574 A | 2/1959 | McMillan et al. |
| 3,175,131 A | 3/1965 | Burleigh et al. |
| 3,786,258 A | 1/1974 | Schmidt |
| 3,794,927 A | 2/1974 | Fleischer et al. |
| 3,921,019 A | 11/1975 | Karasawa |
| 3,925,676 A | 12/1975 | Bigham et al. |
| 4,007,392 A | 2/1977 | Valfells |
| 4,139,777 A * | 2/1979 | Rautenbach ........... 376/112 |
| 4,153,889 A | 5/1979 | Ikegami |
| 4,288,289 A | 9/1981 | Landau |
| 5,037,602 A * | 8/1991 | Dabiri et al. ........... 376/198 |
| 5,139,731 A | 8/1992 | Hendry |
| 5,463,291 A | 10/1995 | Carroll et al. |
| 5,646,488 A | 7/1997 | Warburton |
| 5,874,811 A | 2/1999 | Finlan et al. |
| 5,917,874 A | 6/1999 | Schlyer et al. |

(Continued)

FOREIGN PATENT DOCUMENTS

| | | |
|---|---|---|
| GB | 645758 | 12/1947 |
| GB | 756872 | 10/1953 |

(Continued)

OTHER PUBLICATIONS

International Search Report and Written Opinion issued in connection with PCT/US2010/028090, Sep. 20, 2010.

(Continued)

*Primary Examiner* — Johannes P Mondt
(74) *Attorney, Agent, or Firm* — The Small Patent Law Group; Dean D. Small

(57) ABSTRACT

An isotope production system that includes a cyclotron having a magnet yoke that surrounds an acceleration chamber. The cyclotron is configured to direct a particle beam from the acceleration chamber through the magnet yoke. The isotope production system also includes a target system that is located proximate to the magnet yoke. The target system is configured to hold a target material and includes a radiation shield that extends between the magnet yoke and the target location. The radiation shield is sized and shaped to attenuate gamma rays emitted from the target material toward the magnet yoke. The isotope production system also includes a beam passage that extends from the acceleration chamber to the target location. The beam passage is at least partially formed by the magnet yoke and the radiation shield of the target system.

23 Claims, 11 Drawing Sheets

U.S. PATENT DOCUMENTS

| | | | |
|---|---|---|---|
| 6,057,655 | A | 5/2000 | Jongen |
| 6,163,006 | A | 12/2000 | Doughty et al. |
| 6,236,055 | B1 | 5/2001 | Williams |
| 6,392,246 | B1 | 5/2002 | Wiberg et al. |
| 6,417,634 | B1 | 7/2002 | Bergström |
| 6,433,495 | B1 | 8/2002 | Wiberg |
| 6,445,146 | B1 | 9/2002 | Bergström et al. |
| 6,657,188 | B1 | 12/2003 | Hulet |
| 6,683,426 | B1 | 1/2004 | Kleeven |
| 6,917,044 | B2 | 7/2005 | Amini |
| 7,030,399 | B2 | 4/2006 | Williamson et al. |
| 7,122,966 | B2 | 10/2006 | Norling et al. |
| 7,394,081 | B2 | 7/2008 | Okazaki et al. |
| 7,541,905 | B2 | 6/2009 | Antaya |
| 7,728,311 | B2 | 6/2010 | Gall |
| 2004/0120826 | A1 | 6/2004 | Perkins et al. |
| 2005/0084055 | A1 | 4/2005 | Alvord et al. |
| 2005/0283199 | A1 | 12/2005 | Norling et al. |
| 2006/0104401 | A1 | 5/2006 | Jongen et al. |
| 2007/0171015 | A1 | 7/2007 | Antaya |
| 2007/0176699 | A1* | 8/2007 | Iida et al. ............... 331/79 |
| 2008/0023645 | A1 | 1/2008 | Amelia et al. |
| 2008/0067413 | A1 | 3/2008 | Nutt |
| 2008/0093567 | A1 | 4/2008 | Gall |
| 2008/0240330 | A1 | 10/2008 | Holden |
| 2008/0258653 | A1 | 10/2008 | Nutt |
| 2009/0200483 | A1 | 8/2009 | Gall et al. |
| 2009/0218520 | A1* | 9/2009 | Nutt ................. 250/493.1 |
| 2010/0282978 | A1 | 11/2010 | Norling et al. |
| 2010/0282979 | A1 | 11/2010 | Norling et al. |
| 2010/0283371 | A1 | 11/2010 | Norling et al. |
| 2010/0329406 | A1 | 12/2010 | Norling et al. |

FOREIGN PATENT DOCUMENTS

| | | |
|---|---|---|
| GB | 1485329 | 9/1977 |
| JP | 2002237400 | 8/2002 |
| JP | 2005127901 | 5/2005 |
| RU | 2278431 | 1/2006 |
| WO | 2005/094142 A2 | 10/2005 |
| WO | WO 2006007277 | 1/2006 |
| WO | 2006012467 | 2/2006 |
| WO | WO 2006/015864 | 2/2006 |

OTHER PUBLICATIONS

Y. Jongen & Ryckewaert, "Preliminary Design for a 30 Mev, 500 MicroA H- Cyclotron" IEEE Transactions on Nuclear Science, vol. NS-32, No. 5, Oct. 1985, pp. 2703-2705.

International Search Report and Written Opinion issued in connection with PCT/US2010/031394, Sep. 21, 2010.

E Hartwig, "The AEG Compact Cyclotron" Proceedings of the Fifth International Cyclotron Conference, 1971, pp. 564-572, XP002599602.

H. Okuno et al; The Superconducting Ring Cyclotron in RIKEN, IEEETransactions on Applied Superconductivity IEEE USA, vol. 17 No. 2; pp. 1063-1068, Jun. 2007, Japan.

Search Report & Written Opinion from corresponding application PCT/US2010/037258, Oct. 14, 2010.

V.U. Heidelberger, K. Gisler, R. Knecht, M. Koller, P. Rüttimann, H. Zubler; "First Experience With the Vacuum System of the Cyclotron Comet"; PSI Scientific and Technical Report 2004; vol. VI, 2pgs.

Bruce F. Milton; "Commercial Compact Cyclotrons in the 90's"; TRIUMF, 4004 Wesbrook Mall, Vancouver, B.C. Canada V6T 2A3; 8 pgs.

Kalt, U. et al; "Vacuum System of the Proscan Cyclotron Comet"; PSI Scientific and Technical Report 2002, vol. 6; 1 pg.

Kjellström, R. et al; "MC32 Multiparticle Negative ION Cyclotron", Nuclear Medicine Division, 6 pgs.

Michelato, P. et al; "Operational Experience of the K800 Cyclotron Vacuum System at L.N.S."; 3 pgs.

Strijckmans; "The isochronous cyclotron: principles and recent developments" Institute for Nuclear Sciences, Ghent University, Belgium, Apr. 20, 2000, 10 pgs.

Ohnishi, J. et al; "The Magnetic Field of the Superconducting Ring Cyclotron" 3 pgs.

Marks, Steve; "Magnetic Design of Trim Excitations for the Advanced Light Source Storage Ring Sextupole"; University of California, Jun. 1995, 8 pgs.

Electron and gamma bremsstrahlung beams of JINR and CTU microtrons; Czechoslovak Journal of Physics; v. 50, Jan. 2000; pp. 385.

Berridge, M.S. et al; "High Yield 0-18 Water Target for F-18 Production on MC-17 Cyclotrons", 4pgs.

Highwa, R.D. et al; "Design of Target Systems for Production of PET Nuclides", Div. of Nuclear Medicine, 1989; 4 pgs.

Dehnel, M.; "The TR 16/8, A Dual Particle Cyclotron for Clinical Isotope Production" 4pgs.

Chouhan, Shailendra et al; "Design of Superferric Magnet for the Cyclotron Gas Stopper Project at the NSCL*"; 2007, 3 pgs.

Hichwa. R.D. et al; "Design of Target Systems for Production of PET Nuclides", Nuclear Instruments and Methods in Physics Research B40/41, 1989; 4pgs.

Strijckmans; "The isochronnous cyclotron; principles and recent devlopments" Institute for Nuclear Sciences, Chent University, Belgium, Apr. 20, 2000, 10 pgs.

A.I Papash & Yu G. Alenitsky, Commercial Cyclotrons. Part 1: Commercial Cyclotrons in the Energy Range 10-30 MeV for Isotope Production; Physics of Particles and Nuclei, vol. 39, No. 4, 2008.

International Search Report and Written Opinion issued in connection with PCT/US2010/028573, Sep. 28, 2010.

K. Strijckmans, "The Isochronous Cyclotron: Principles and Recent Developments," Computerized Medical Imaging and Graphics, vol. 25, Issue 2, pp. 69-78, Mar. 2001.

Hichwa, R. D., et al. "Design of target systems for production of PET nuclides," Nuclear Instruments and Methods in Physics Research, B40/41, (1989), pp. 1110-1113.

* cited by examiner

ISOTOPE PRODUCTION SYSTEM WITH SEPARATED SHIELDING

CROSS-REFERENCES TO RELATED APPLICATIONS

The present application includes subject matter related to subject matter disclosed in U.S. patent application Ser. No. 12/435,903 entitled "ISOTOPE PRODUCTION SYSTEM AND CYCLOTRON"; application Ser. No. 12/435,949 entitled "ISOTOPE PRODUCTION SYSTEM AND CYCLOTRON HAVING A MAGNET YOKE WITH A PUMP ACCEPTANCE CAVITY"; application Ser. No. 12/435,931 entitled "ISOTOPE PRODUCTION SYSTEM AND CYCLOTRON HAVING REDUCED MAGNETIC STRAY FIELDS"; all of which were filed on May 5, 2009 and all of which are incorporated by reference in their entirety.

BACKGROUND OF THE INVENTION

Embodiments of the invention described herein relate generally to isotope production systems, and more particularly to isotope production systems that may be safely used in relatively confined spaces, such as hospital rooms.

Radioisotopes (also called radionuclides) have several applications in medical therapy, imaging, and research, as well as other applications that are not medically related. Systems that produce radioisotopes typically include a particle accelerator, such as a cyclotron, that has a magnet yoke that surrounds an acceleration chamber. The acceleration chamber may include opposing pole tops that are spaced apart from each other. Electrical and magnetic fields may be generated within the acceleration chamber to accelerate and guide charged particles along a spiral-like orbit between the poles. To produce the radioisotopes, the cyclotron forms a beam of the charged particles and directs the particle beam out of the acceleration chamber and toward a target system having a target material. The particle beam is incident upon the target material thereby generating radioisotopes.

During operation of an isotope production system, large amounts of radiation (i.e., unhealthy levels of radiation for individuals nearby) may be generated within the target system and, separately, within the cyclotron. For example, with respect to the target system, radiation from neutrons and gamma rays may be generated when the beam is incident upon the target material. With respect to the cyclotron, ions within the acceleration chamber may collide with gas particles therein and become neutral particles that are no longer affected by the electrical and magnetic fields within the acceleration chamber. These neutral particles, in turn, may collide with the walls of the acceleration chamber and produce secondary gamma radiation. To protect nearby individuals from the radiation (e.g., employees or patients of a hospital), isotope production systems may use shields to attenuate or block the radiation.

In some conventional isotope production systems, radiation leakage has been addressed by adding a large amount of shielding that surrounds both the cyclotron and the target system. However, the large amounts of shielding may be costly and too heavy for the rooms where the isotope production system are to be located. Alternatively or in addition to the large amounts of shielding, isotope production systems may be located within a specially designed room or rooms. For example, the cyclotron and the target system may be in separate rooms or have large walls separating the two. However, designing specific rooms for isotope production systems raises new challenges, especially for pre-existing rooms that were not originally intended for radioisotope production.

Yet another challenge presented by radiation leakage is how to remove the isotope production system when, for example, it is replaced or moved to another location. Decommissioning an isotope production system includes safely disassembling the system and removing and storing the radioactive parts and materials. Another concern is decontaminating the room where the isotope production system was located. In some instances, original support structures of the room, such as floors, ceilings, and walls, must be removed because the support structures have been contaminated by radioactivity. Such decommissioning and decontaminating procedures can be costly and time-consuming.

Accordingly, there is a need for methods, cyclotrons, and isotope production systems that reduce radiation exposure to individuals in the room or nearby area. Furthermore, there is a need for isotope production systems that may be more easily decommissioned than known systems.

BRIEF DESCRIPTION OF THE INVENTION

In accordance with one embodiment, an isotope production system that includes a cyclotron having a magnet yoke that surrounds an acceleration chamber is provided. The cyclotron is configured to direct a particle beam from the acceleration chamber through the magnet yoke. The isotope production system also includes a target system that is located proximate to the magnet yoke. The target system is configured to hold a target material and includes a radiation shield that extends between the magnet yoke and the target location. The radiation shield is sized and shaped to attenuate gamma and neutron rays emitted from the target material toward the magnet yoke. The isotope production system also includes a beam passage that extends from the acceleration chamber to the target location. The beam passage is at least partially formed by the magnet yoke and the radiation shield of the target system.

In accordance with another embodiment, an isotope production system is provided that includes a cyclotron that has a base supported on a platform. The cyclotron includes a magnet yoke that surrounds an acceleration chamber. The cyclotron is configured to direct a particle beam from the acceleration chamber through the magnet yoke. The isotope production system also includes a target system that is located on the platform and adjacent to the magnet yoke. The target system is configured to hold a target material at a target location. The particle beam is incident upon the target material. The isotope production system also includes a beam passage that extends from the acceleration chamber to the target location. The beam passage is at least partially formed by the magnet yoke and the target system. The beam passage extends along a beam axis that intersects the platform.

In yet another embodiment, a method of decommissioning an isotope production system located in a room of a facility is provided. The method includes providing an isotope production system that has a cyclotron having a base supported on a platform. The platform is supported by a floor of the room. The cyclotron is configured to direct a particle beam along a beam passage to a target system. The target system is located on the platform adjacent to the magnet yoke. The beam passage extends along a beam axis that intersects the platform. The method also includes removing the target system from the platform and removing the platform from the floor of the facility.

DETAILED DESCRIPTION OF THE INVENTION

Figure 1:
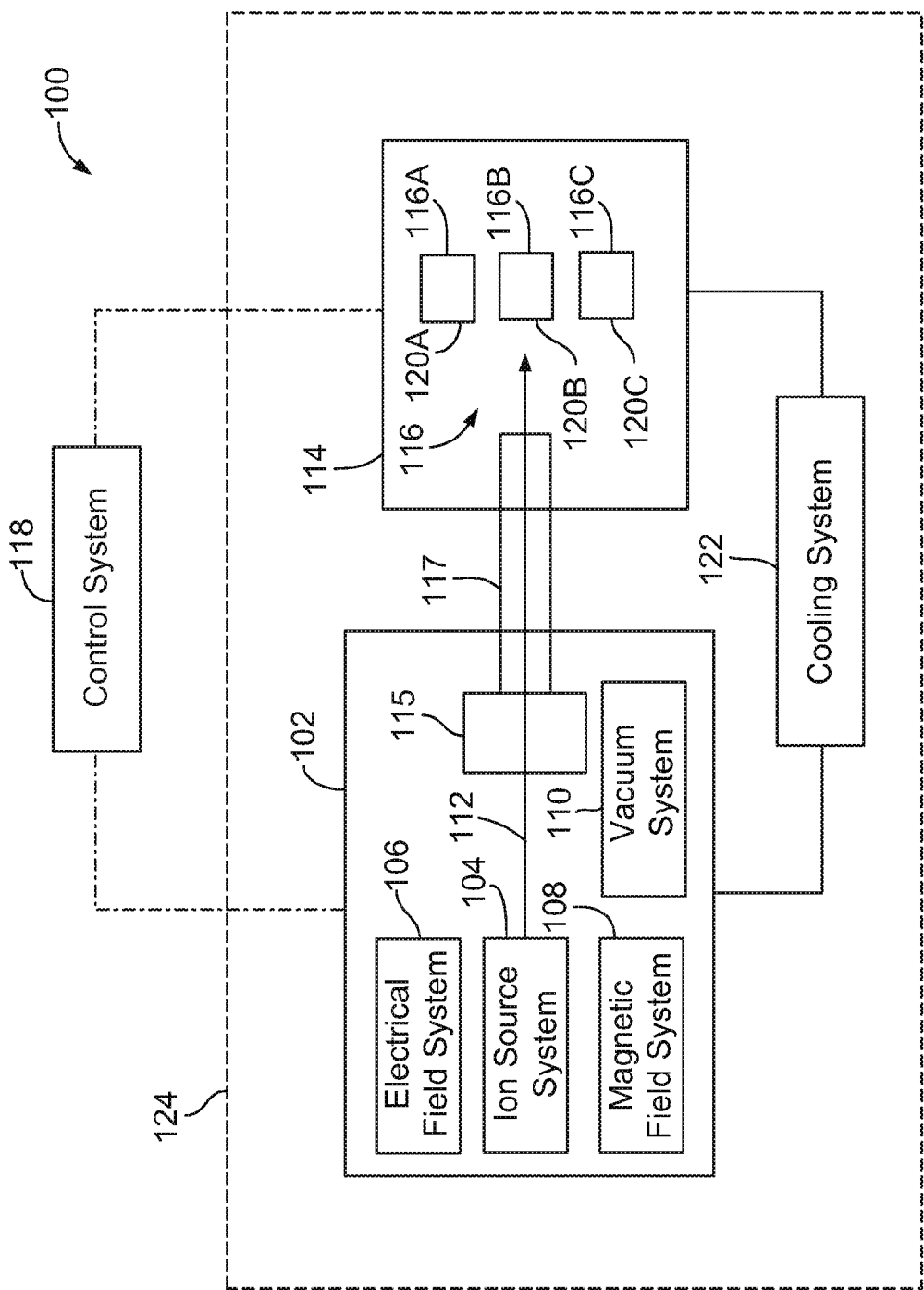
FIG. 1 is a block diagram of an isotope production system formed in accordance with one embodiment.

FIG. 1 is a block diagram of an isotope production system 100 formed in accordance with one embodiment. The system 100 includes a cyclotron 102 that has several sub-systems including an ion source system 104, an electrical field system 106, a magnetic field system 108, and a vacuum system 110. During use of the cyclotron 102, charged particles are placed within or injected into the cyclotron 102 through the ion source system 104. The magnetic field system 108 and electrical field system 106 generate respective fields that cooperate with one another in producing a particle beam 112 of the charged particles.

Also shown in FIG. 1, the system 100 has an extraction system 115 and a target system 114 that includes a target material 116. The target system 114 may be positioned adjacent to the cyclotron 102. To generate isotopes, the particle beam 112 is directed by the cyclotron 102 through the extraction system 115 along a beam transport path or beam passage 117 and into the target system 114 so that the particle beam 112 is incident upon the target material 116 located at a corresponding target location 120. When the target material 116 is irradiated with the particle beam 112, radiation from neutrons and gamma rays may be generated.

The system 100 may have multiple target locations 120A-C where separate target materials 116A-C are located. A shifting device or system (not shown) may be used to shift the target locations 120A-C with respect to the particle beam 112 so that the particle beam 112 is incident upon a different target material 116. A vacuum may be maintained during the shifting process as well. Alternatively, the cyclotron 102 and the extraction system 115 may not direct the particle beam 112 along only one path, but may direct the particle beam 112 along a unique path for each different target location 120A-C. Furthermore, the beam passage 117 may be substantially linear from the cyclotron 102 to the target location 120 or, alternatively, the beam passage 117 may curve or turn at one or more points therealong. For example, magnets positioned alongside the beam passage 117 may be configured to redirect the particle beam 112 along a different path.

Examples of isotope production systems and/or cyclotrons having one or more of the sub-systems described above are described in U.S. Pat. Nos. 6,392,246; 6,417,634; 6,433,495; and 7,122,966 and in U.S. Patent Application Publication No. 2005/0283199, all of which are incorporated by reference in their entirety. Additional examples are also provided in U.S. Pat. Nos. 5,521,469; 6,057,655; and in U.S. Patent Application Publication Nos. 2008/0067413 and 2008/0258653; all of which are incorporated by reference in their entirety. Furthermore, isotope production systems and/or cyclotrons that may be used with embodiments described herein are also described in copending U.S. patent application Ser. Nos. 12/435,903; 12/435,949; and 12/435,931 all of which are incorporated by reference in their entirety.

The system 100 is configured to produce radioisotopes (also called radionuclides) that may be used in medical imaging, research, and therapy, but also for other applications that are not medically related, such as scientific research or analysis. When used for medical purposes, such as in Nuclear Medicine (NM) imaging or Positron Emission Tomography (PET) imaging, the radioisotopes may also be called tracers. By way of example, the system 100 may generate protons to make $^{18}F^-$ isotopes in liquid form, $^{11}C$ isotopes as $CO_2$, and $^{13}N$ isotopes as $NH_3$. The target material 116 used to make these isotopes may be enriched $^{18}O$ water, natural $^{14}N_2$ gas, $^{16}O$-water, and $^{15}N_2$ gas. The system 100 may also generate protons or deuterons in order to produce $^{15}O$ gases (oxygen, carbon dioxide, and carbon monoxide) and $^{15}O$ labeled water.

In some embodiments, the system 100 uses $^1H^-$ technology and brings the charged particles to a low energy (e.g., about 7.8 MeV) with a beam current of approximately 10-30 μA. In such embodiments, the negative hydrogen ions are accelerated and guided through the cyclotron 102 and into the extraction system 115. The negative hydrogen ions may then hit a stripping foil (not shown) of the extraction system 115 thereby removing the pair of electrons and making the particle a positive ion, $^1H^+$. However, in alternative embodiments, the charged particles may be positive ions, such as $^1H^+$, $^2H^+$, and $^3He^+$. In such alternative embodiments, the extraction system 115 may include an electrostatic deflector that creates an electric field that guides the particle beam toward the target material 116.

The system 100 may include a cooling system 122 that transports a cooling or working fluid to various components of the different systems in order to absorb heat generated by the respective components. The system 100 may also include a control system 118 that may be used by a technician to control the operation of the various systems and components. The control system 118 may include one or more user-interfaces that are located proximate to or remotely from the cyclotron 102 and the target system 114. Although not shown in FIG. 1, the system 100 may also include one or more radiation and/or magnetic shields for the cyclotron 102 and the target system 114.

The system 100 may produce the isotopes in predetermined amounts or batches, such as individual doses for use in medical imaging or therapy. A production capacity for the system 100 for the exemplary isotope forms listed above may be 50 mCi in less than about ten minutes at 20 μA for $^{18}F^-$; and 300 mCi in about thirty minutes at 30 μA for $^{11}CO_2$.

Also, the system 100 may use a reduced amount of space with respect to known isotope production systems such that the system 100 has a size, shape, and weight that would allow the system 100 to be held within a confined space. For example, the system 100 may fit within pre-existing rooms that were not originally built for particle accelerators, such as in a hospital or clinical setting. As such, the cyclotron 102, the extraction system 115, the target system 114, and one or more components of the cooling system 122 may be held within a common housing 124 that is sized and shaped to be fitted into a confined space. As one example, the total volume used by the housing 124 may be 2 m³. Possible dimensions of the housing 124 may include a maximum width of approximately 2.2 m, a maximum height of approximately 1.7 m, and a maximum depth of approximately 1.2 m. The combined weight of the housing and systems therein may be approximately 10000 kg. However, embodiments described herein are not limited to the size and weight noted above and may have greater sizes and weights. The housing 124 may be fabricated from polyethylene (PE) and lead (Pb) and have a thickness configured to attenuate neutron flux and gamma rays from the cyclotron 102. For example, the housing 124 may have a thickness (measured between an inner surface that surrounds the cyclotron 102 and an outer surface of the housing 124) of at least about 10 mm along predetermined portions of the housing 124 that attenuate the neutron and gamma flux.

The system 100 may be configured to accelerate the charged particles to a predetermined energy level. For example, some embodiments described herein accelerate the charged particles to an energy of approximately 18 MeV or less. In other embodiments, the system 100 accelerates the charged particles to an energy of approximately 16.5 MeV or less. In particular embodiments, the system 100 accelerates the charged particles to an energy of approximately 9.6. MeV or less. In more particular embodiments, the system 100 accelerates the charged particles to an energy of approximately 7.8 MeV or less.

Figure 2:
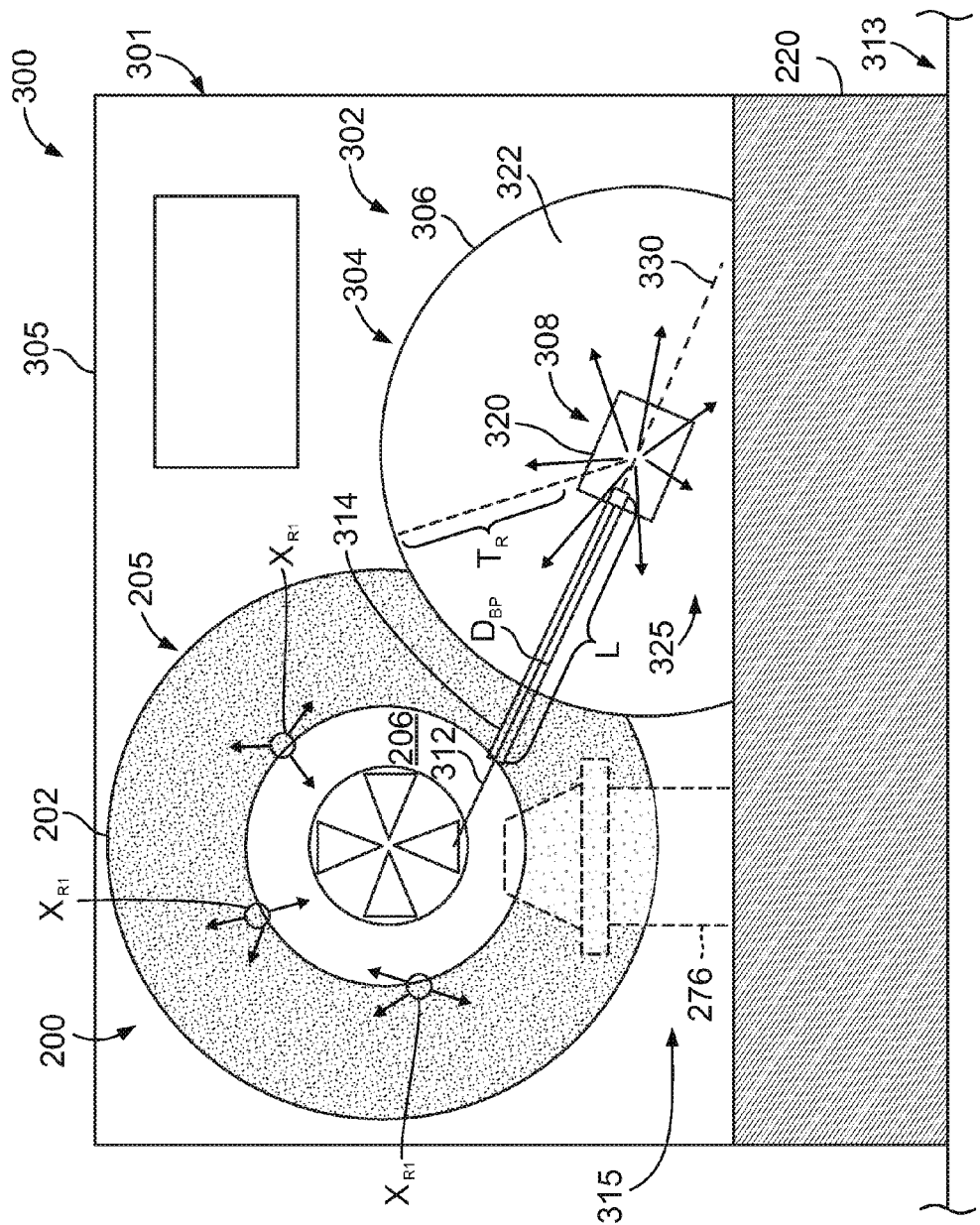
FIG. 2 is a schematic side view of an isotope production system in accordance with one embodiment.
Figure 3:
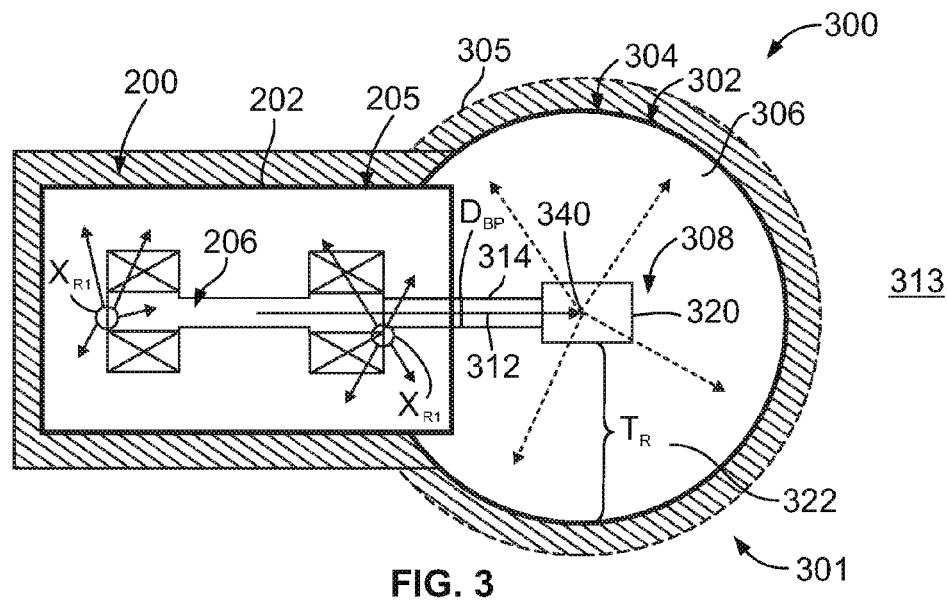
FIG. 3 is a plan view from above the isotope production system shown in FIG. 2.

FIGS. 2 and 3 are a schematic side view and a schematic top plan view, respectively, of an isotope production (IP) system 300 formed in accordance with one embodiment. The IP system 300 includes a cyclotron 200 having a magnet yoke 202 and also includes a target system 302 that includes a radiation shield 306 and a target region 308 located within the radiation shield 306. The magnet yoke 202 includes an acceleration chamber 206 where a particle beam 312 is generated and directed through the magnet yoke 202 and toward the target region 308 along a beam passage 314. The beam passage 314 is at least partially formed by the magnet yoke 202 and the radiation shield 306. Although not shown, the IP system 300 may include an extraction system to facilitate removing and directing the particle beam 312 from the cyclotron 200. The radiation shield completely surrounds the target location except for the beam passage.

Also shown, the cyclotron 200 and the target system 302 may be enclosed within a common housing 305. In some embodiments, the IP system 300 also includes a separate platform 220 (FIG. 2) that rests upon a floor or ground 313 of the area in which the IP system 300 is located. The cyclotron 200, the target system 302, and the housing 305 may rest upon the platform 220. For example, the cyclotron 200 may include a base 315 that is at least partially supported on the platform 220. The base 315 may be formed from the magnet yoke 202 or may be a portion of the housing 305. The base 315 may also include a vacuum pump 276 that is positioned between the magnet yoke 202 and the platform 220. The vacuum pump 276 may be configured to maintain an evacuated state within the acceleration chamber 206, the beam passage 314, and within the target region 308.

Embodiments described herein include separated shielding systems where radiation generated within the cyclotron 200 is at least partially attenuated by the magnet yoke 202 and where radiation generated within the target region 308 is at least partially attenuated by the radiation shield 306. When the charged particles are accelerated and guided along a predetermined path within the acceleration chamber 206, ions within the acceleration chamber 206 may collide with gas particles therein and become neutral particles that are no longer affected by the electrical and magnetic fields. The neutral particles may be sprayed along a mid plane 232 (FIG. 4) of the magnet yoke 202 and around a periphery of the acceleration chamber 206 therein. Interception panels (not shown) may be positioned within the acceleration chamber 206 to facilitate capturing the neutral particles.

FIGS. 2 and 3 illustrate several points $X_{R1}$ where particles may collide with the magnet yoke 202 and generate neutron and gamma radiation. The gamma rays emit from the corresponding points $X_{R1}$ in an isotropic manner (i.e., away from the corresponding point $X_{R1}$ in a spherical manner). The dimensions of the magnet yoke 202 may be sized to attenuate the radiation of the gamma rays within the acceleration chamber 206. For example, dimensions of conventional magnet yokes are typically determined by the desired magnetic field needed to form the particle beam within the acceleration chamber. However, dimensions of the magnet yoke 202 may be thicker than what is required to form the desired magnetic field. The additional thickness of the magnet yoke 202 may facilitate attenuating the radiation emitting from the acceleration chamber 206. Furthermore, the cyclotron 200 may be operated at a low energy that produces a relatively low amount of neutral particles. For example, the IP system 300 may bring the charged particles to an energy level of approximately 9.6 MeV or, more specifically, 7.8 MeV or less.

With respect to the target system 302, the target region 308 includes a target location 340 (shown in FIG. 7) where a target material is located. When the particle beam 312 is incident upon the target material, radiation from gamma rays and neutrons may be generated and emitted from the target material and from ancillary components that are proximate to the target material. Furthermore, the emitted neutrons may also generate gamma rays when the neutrons interact with matter within the target system 302. As such, the radiation shield 306 is configured to attenuate the radiation.

The target region 308 may be located proximate to a geometric center of the radiation shield 306. By way of one example, the target region 308 may be located in a predetermined location within the radiation shield 306 so that an exterior boundary 301 of the IP system 300 has a dose rate of less than a desired value (e.g., less than about 4 µSv/h or less than about 2 µSv/h). An "exterior boundary" includes an exterior surface of the IP system 300 that may be touched by a user when the IP system 300 is in normal operation. For example, the exterior boundary 301 is shown as an exterior surface 301 of the housing 305 in FIG. 3. However, in alternative embodiments, the exterior boundary 301 may be the exterior surface 304 of the radiation shield 306 or the exterior surface 205 of the cyclotron 200. As such, the dose rate may be measured from the exterior surface 301 if there is a housing 305 or, alternatively, from the exterior surfaces 205 and 304 if there is no housing.

The magnet yoke 202 and the radiation shield 306 may comprise different material compositions that are configured to attenuate the radiation emitting from the corresponding area. For example, the magnet yoke 202 may be formed from iron. Dimensions of the material that forms the magnet yoke 202 may be increased in order to attenuate the radiation emitting from within the acceleration chamber 206. The radiation shield 306, on the other hand, may have a different material composition including separate layers or structures of different materials. For example, the radiation shield 306 may comprise a first or inner shielding structure 320 and a second or outer shielding structure 322 that surrounds the first shielding structure 320. The first shielding structure 320 may immediately surround the target region 308 and be configured to attenuate the gamma radiation emitting from therein. In one example, the first shielding structure 320 includes a cage that is formed from mostly lead (Pb) or nearly pure lead (Pb). However, other materials configured to attenuate the gamma radiation may be used with the first shielding structure 320.

The second shielding structure 322 may surround the first shielding structure 320 and be configured to attenuate the neutrons and also the gamma rays emitting from the target region 308 and also to attenuate gamma rays generated by neutron capture. The second shielding structure 322 may have a spherical shape. A majority of the material composition comprising the second shielding structure 322 may include polyethylene. Other material may include lead (Pb) and boron in smaller amounts. In one particular embodiment, the second shielding structure 322 includes about 80% polyethylene (including 3% boron) and about 20% lead (Pb). However, other elements or materials may be included in the material composition of the first and second shielding structures 320 and 322.

Also shown in FIGS. 2 and 3, the target system 302 may be located adjacent to the magnet yoke 202. As used herein, the target system 302 and the magnet yoke 202 are "adjacent to" one another when the target system 302 and the magnet yoke 202 are proximate to or near each other without a substantial distance or spacing between the two. For example, in the illustrated embodiment, a portion of the radiation shield 306 is shaped to fit within a shield-acceptance cut-out or recess 262 (shown in FIG. 4). More specifically, a portion of the radiation shield 306 may be shaped to conform to a shape of the shield-acceptance recess 262. Furthermore, the exterior surfaces 304 and 205 may directly abut each other. However, in other embodiments where the target system 302 is adjacent to the magnet yoke 202, the exterior surface 205 may not form a shield-acceptance recess 262. Instead, the exterior surfaces 304 and 205 may still directly abut each other along, for example, planar portions of the exterior surfaces 304 and 205.

In alternative embodiments, the target system 302 and the magnet yoke 202 may be adjacent to one another having only a small spacing between the exterior surfaces 304 and 205 (e.g., less than about 25 centimeters or less than about 10 centimeters). However, in alternative embodiments, the target system 302 and the magnet yoke 202 are not adjacent to each other but may be, for example, separated by half a meter or more meters.

Also shown in FIG. 2, the radiation shield 306 may have a radial thickness $T_R$ extending from the target region 308 to the exterior surface 304. The radial thickness $T_R$ may be configured so that the exterior surface 304 experiences at most a limited dose rate. As shown, the radial thickness $T_R$ may have a varying length or dimension. For example, the radial thickness $T_R$ may have a reduced portion 325 that extends between the target region 308 and the platform 220 or ground 313. The remaining portion(s) of the radiation shield 306 may have a substantially equal radial thickness $T_R$. The reduced portion 325 of the radiation shield 306 may be used, for example, where the target system 302 rests upon the platform 220 or, alternatively, directly upon the ground 313. The platform 220 may comprise a material (e.g., concrete) and have a thickness $T_C$ that is configured to absorb radiation leakage from at least one of the cyclotron 200 and the target system 302.

The beam passage 314 is at least partially formed by the magnet yoke 202 and the radiation shield 306 of the target system 302. In the illustrated embodiment, the beam passage 314 may be substantially linear as shown in FIGS. 2 and 3.

Figure 7:
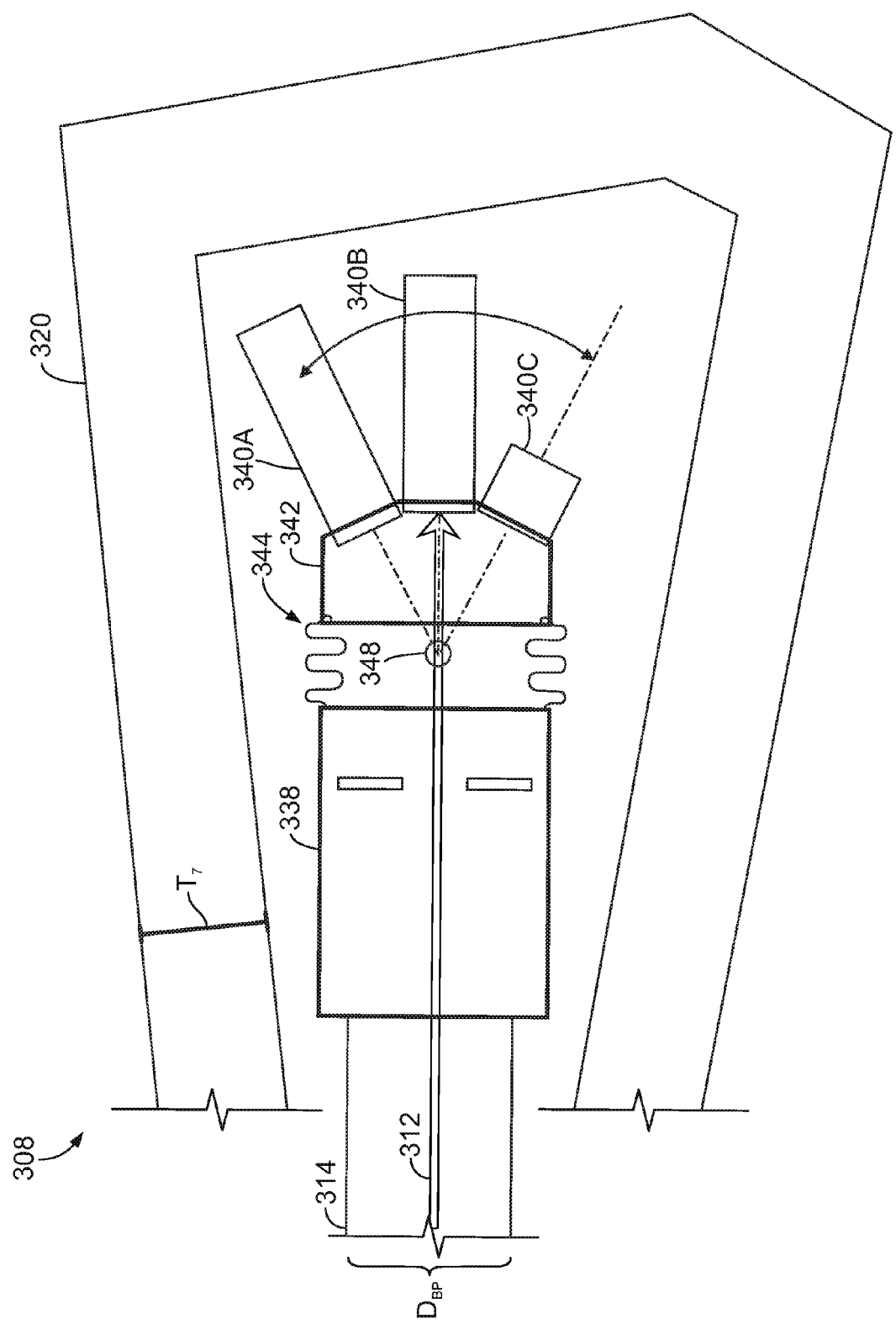
FIG. 7 is a schematic side view of a target region used with the isotope production system of FIG. 2.

Alternatively, the beam passage 314 may have curves or abrupt turns therealong. For example, in alternative embodiments, magnets may be positioned alongside the beam passage and configured to direct or redirect the particle beam 312 along a different path. Furthermore, the beam passage may have a cross-sectional diameter $D_{BP}$ and a distance or length L. The diameter $D_{BP}$ and the length L are sized and shaped to reduce an amount of neutrons emanating from the target material and into the beam passage 314 in order to significantly reduce or eliminate any neutrons re-entering the acceleration chamber 206. The length L may be measured form an interior surface of the acceleration chamber 206 to the target location 340 (FIG. 7). In some embodiments, the length L is between about 0.5 meters and about 1.5 meters. Also, although not shown, the beam passage 314 may be formed from a pipe or conduit that is formed from a material other than the material that forms the magnet yoke 202 and the radiation shield 306.

With respect to FIG. 2, the particle beam 312 and the beam passage 314 may extend along a beam axis 330. The beam axis 330 may be directed at least partially downward, i.e., toward the ground or floor 313. In some embodiments, the beam axis 330 may intersect the platform 220. In such embodiments, when the IP system 300 is to be decommissioned and when the room of the facility where the IP system 300 is located is to be decontaminated, the housing 305, the cyclotron 200, and the target system 302 may be removed from the platform 220. The platform 220 may then be removed from the facility in a controlled manner (i.e., according to safety standards with respect to the removal of radioactive material). As such, the platform 220 may protect or otherwise prevent the removal of pre-existing support structures within the room. For example, by using the platform 220, other support structures, such as ceilings, floors, and walls, may be kept within the room.

Figure 4:
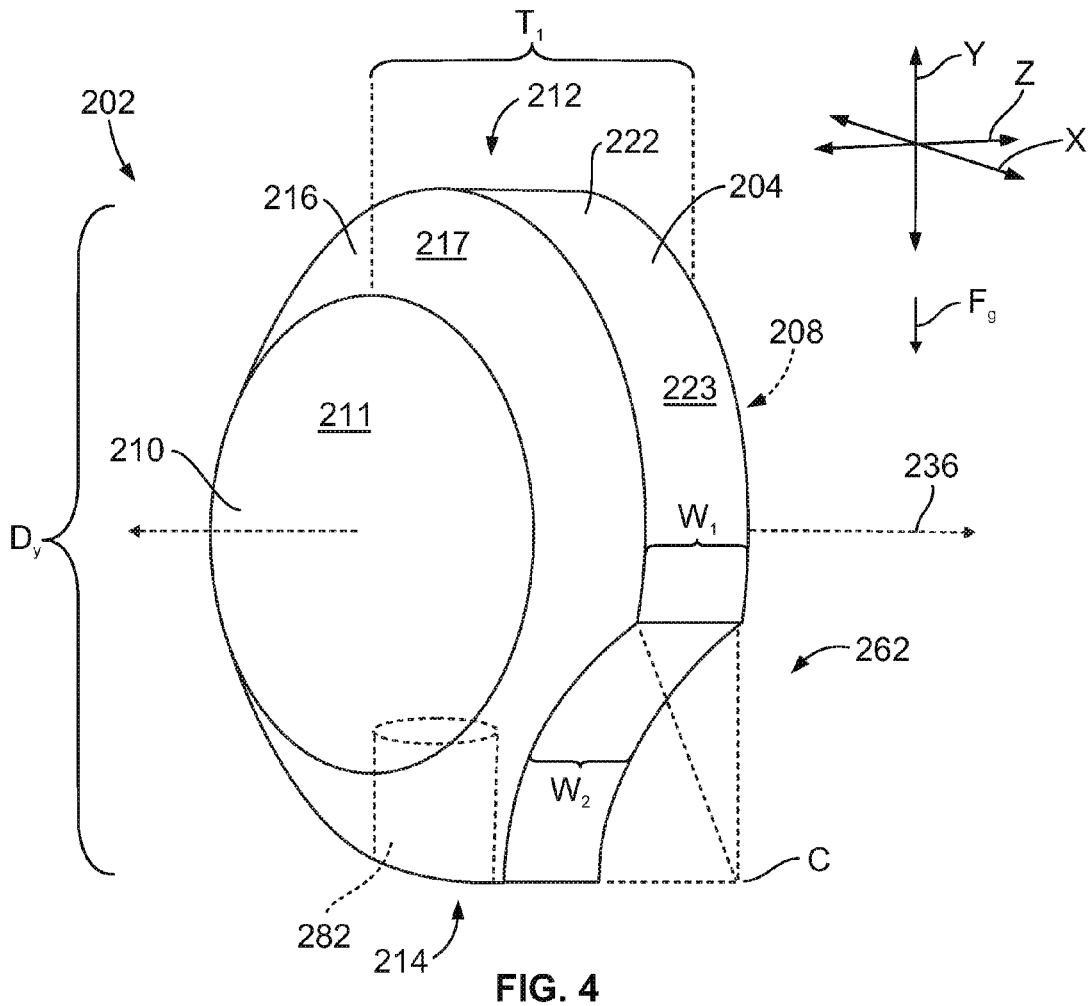
FIG. 4 is a perspective view of a magnet yoke formed in accordance with one embodiment.

FIGS. 4-7 describe the IP system 300 and its components in greater detail. FIG. 4 is a perspective view of the magnet yoke 202 formed in accordance with one embodiment. The magnet yoke 202 is oriented with respect to X, Y, and Z-axes. In some embodiments, the magnet yoke 202 is oriented vertically with respect to the gravitational force $F_g$. The magnet yoke 202 has a yoke body 204 that may be substantially circular about a central axis 236 that extends through a center of the yoke body 204 parallel to the Z-axis. The yoke body 204 may be manufactured from iron and/or another ferromagnetic material and may be sized and shaped to produce a desired magnetic field.

Figure 5:
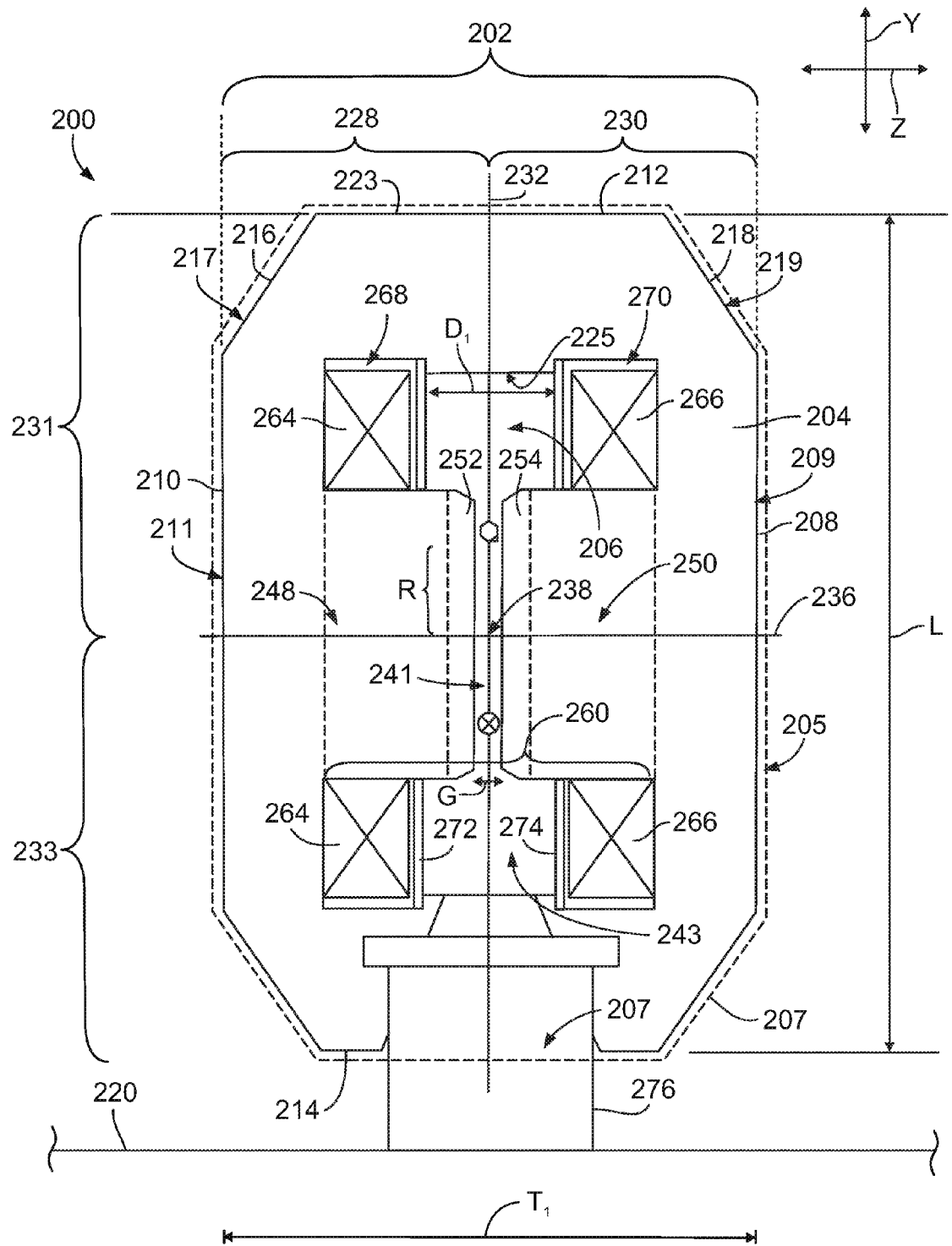
FIG. 5 is a side view of a cyclotron formed in accordance with one embodiment.

The yoke body 204 has a radial portion 222 that curves circumferentially about the central axis 236. The radial portion 222 has an outer radial surface 223 that extends a width $W_1$. The width $W_1$ of the radial surface 223 may extend in an axial direction along the central axis 236. When the yoke body 204 is oriented vertically, the radial portion 222 may have top and bottom ends 212 and 214 with a diameter $D_Y$ of the yoke body 204 extending therebetween. The yoke body 204 may also have opposite sides 208 and 210 that are separated by a thickness $T_1$ of the yoke body 204. Each side 208 and 210 has a corresponding side surface 209 and 211, respectively (side surface 209 is shown in FIG. 5). The side surfaces 209 and 211 may extend substantially parallel to each other and may be substantially planar (i.e., along a plane formed by the X and Y axes). The radial portion 222 is connected to the sides 208 and 210 through corners or transition regions 216 and 218 that have corner surfaces 217 and 219, respectively. (The transition region 218 and the corner surface 219 are shown in FIG. 5.) The corner surfaces 217 and 219 extend from the radial surface 223 away from each other and toward the central axis 236 to corresponding side surfaces 211 and 209. The radial surface 223, the side surfaces 209 and 211, and the corner surfaces 217 and 219 collectively form an exterior surface 205 (FIG. 5) of the yoke body 204.

The yoke body 204 may have several cut-outs, recesses, or passages that lead into the yoke body 204. For example, the exterior surface 205 of the yoke body 204 may form a shield-acceptance recess 262 that is sized and shaped to receive a radiation shield 306 from a target system 302 (FIG. 2). As shown, the shield-acceptance recess 262 has a width $W_2$ that extends along the central axis 236. In the illustrated embodiment, the shield-acceptance recess 262 curves inward into the radial portion 222 and toward the central axis 236 through the thickness $T_1$. Although not shown in FIG. 4, the beam passage 314 may extend through the radial portion 222 proximate to the shield-acceptance recess 262. As such, the width $W_1$ is less than the width $W_2$. Also, the shield-acceptance recess 262 may have a radius of curvature having a center (indicated as a point C) that is outside of the exterior surface 205. The point C may represent an approximate location of the target location 340 (FIG. 7). In alternative embodiments, the shield-acceptance recess 262 may have other dimensions that are configured to receive the radiation shield. Furthermore, in other embodiments, the yoke body 204 may not have a shield-acceptance recess 262 but may be positioned proximate to the radiation shield. Also shown, the yoke body 204 may form a pump acceptance (PA) cavity 282 that is sized and shaped to receive a vacuum pump 276 (FIG. 2).

FIG. 5 is a side view of a cyclotron 200 formed in accordance with one embodiment. The cyclotron 200 includes the magnet yoke 202 described above with respect to FIGS. 2-4. As shown in FIG. 5, the yoke body 204 may be divided into opposing yoke sections 228 and 230 that define the acceleration chamber 206 therebetween. The yoke sections 228 and 230 are configured to be positioned adjacent to one another along a mid-plane 232 of the magnet yoke 202. The cyclotron 200 may rest on a platform 220 that is configured to support the weight of the cyclotron 200. The platform 220 may be, for example, a floor of a room or an additional slab of material (e.g., of cement) that is supported by the floor. The central axis 236 extends perpendicular to the mid-plane 232 through a center of the yoke body 204 between the side surfaces 209 and 211. The acceleration chamber 206 has a central region 238 located at an intersection of the mid-plane 232 and the central axis 236. In some embodiments, the central region 238 is at a geometric center of the acceleration chamber 206. Also shown, the magnet yoke 202 includes an upper portion 231 extending above the central axis 236 and a lower portion 233 extending below the central axis 236.

The yoke sections 228 and 230 include poles 248 and 250, respectively, that oppose each other across the mid-plane 232 within the acceleration chamber 206. The poles 248 and 250 may be separated from each other by a pole gap G. The pole gap G is sized and shaped to produce a desired magnetic field when the cyclotron 200 is in operation. Furthermore, the pole gap G may be sized and shaped based upon a desired conductance for removing particles within the acceleration chamber. As an example, in some embodiments, the pole gap G may be 3 cm.

The pole 248 includes a pole top 252 and the pole 250 includes a pole top 254 that faces the pole top 252. In the illustrated embodiment, the cyclotron 200 is an isochronous cyclotron where the pole tops 252 and 254 each form an arrangement of sectors of hills and valleys (not shown). The hills and the valleys interact with each other to produce a magnetic field for focusing the path of the charged particles. The yoke sections 228 or 230 may also include radio frequency (RF) electrodes (not shown) that include hollow dees located within the corresponding valleys. The RF electrodes cooperate with each other and form a resonant system that includes inductive and capacitive elements tuned to a predetermined frequency (e.g., 100 MHz). The RF electrode system may have a high frequency power generator (not shown) that may include a frequency oscillator in communication with one or more amplifiers. The RF electrode system creates an alternating electrical potential between the RF electrodes and ground.

The cyclotron 200 also includes a magnet assembly 260 located within or proximate the acceleration chamber 206. The magnet assembly 260 is configured to facilitate producing the magnetic field with the poles 248 and 250 to direct charged particles along a desired path. The magnet assembly 260 includes an opposing pair of magnet coils 264 and 266 that are spaced apart from each other across the mid-plane 232 at a distance $D_1$. The magnet coils 264 and 266 may be, for example, copper alloy resistive coils. Alternatively, the magnet coils 264 and 266 may be an aluminum alloy. The magnet coils may be substantially circular and extend about the central axis 236. The yoke sections 228 and 230 may form magnet coil cavities 268 and 270, respectively, that are sized and shaped to receive the corresponding magnet coils 264 and 266, respectively. Also shown in FIG. 5, the cyclotron 200 may include chamber walls 272 and 274 that separate the magnet coils 264 and 266 from the acceleration chamber 206 and facilitate holding the magnet coils 264 and 266 in position.

The acceleration chamber 206 is configured to allow charged particles, such as $^1H^-$ ions, to be accelerated therein along a predetermined curved path that wraps in a spiral manner about the central axis 236 and remains substantially along the mid-plane 232. The charged particles are initially positioned proximate to the central region 238. When the cyclotron 200 is activated, the path of the charged particles may orbit around the central axis 236. In the illustrated embodiment, the cyclotron 200 is an isochronous cyclotron and, as such, the orbit of the charged particles has portions that curve about the central axis 236 and portions that are more linear. However, embodiments described herein are not limited to isochronous cyclotrons, but also includes other types of cyclotrons and particle accelerators. As shown in FIG. 5, when the charged particles orbit around the central axis 236, the charged particles may project out of the page in the upper portion 231 of the acceleration chamber 206 and extend into the page in the lower portion 233 of the acceleration chamber 206. As the charged particles orbit around the central axis 236, a radius R that extends between the orbit of the charged particles and the central region 238 increases. When the charged particles reach a predetermined location along the orbit, the charged particles are directed into or through an extraction system (not shown) and out of the cyclotron 200.

The acceleration chamber 206 may be in an evacuated state before and during the forming of the particle beam 312 (FIG. 2). For example, before the particle beam is created, a pressure of the acceleration chamber 206 may be approximately $1 \times 10^{-7}$ millibars. When the particle beam is activated and $H_2$ gas is flowing through an ion source (not shown) located at the central region 238, the pressure of the acceleration chamber 206 may be approximately $2 \times 10^{-5}$ millibar. The vacuum pump 276 may include a portion that projects radially outward from the end 214 of the yoke body 204.

Figure 10:
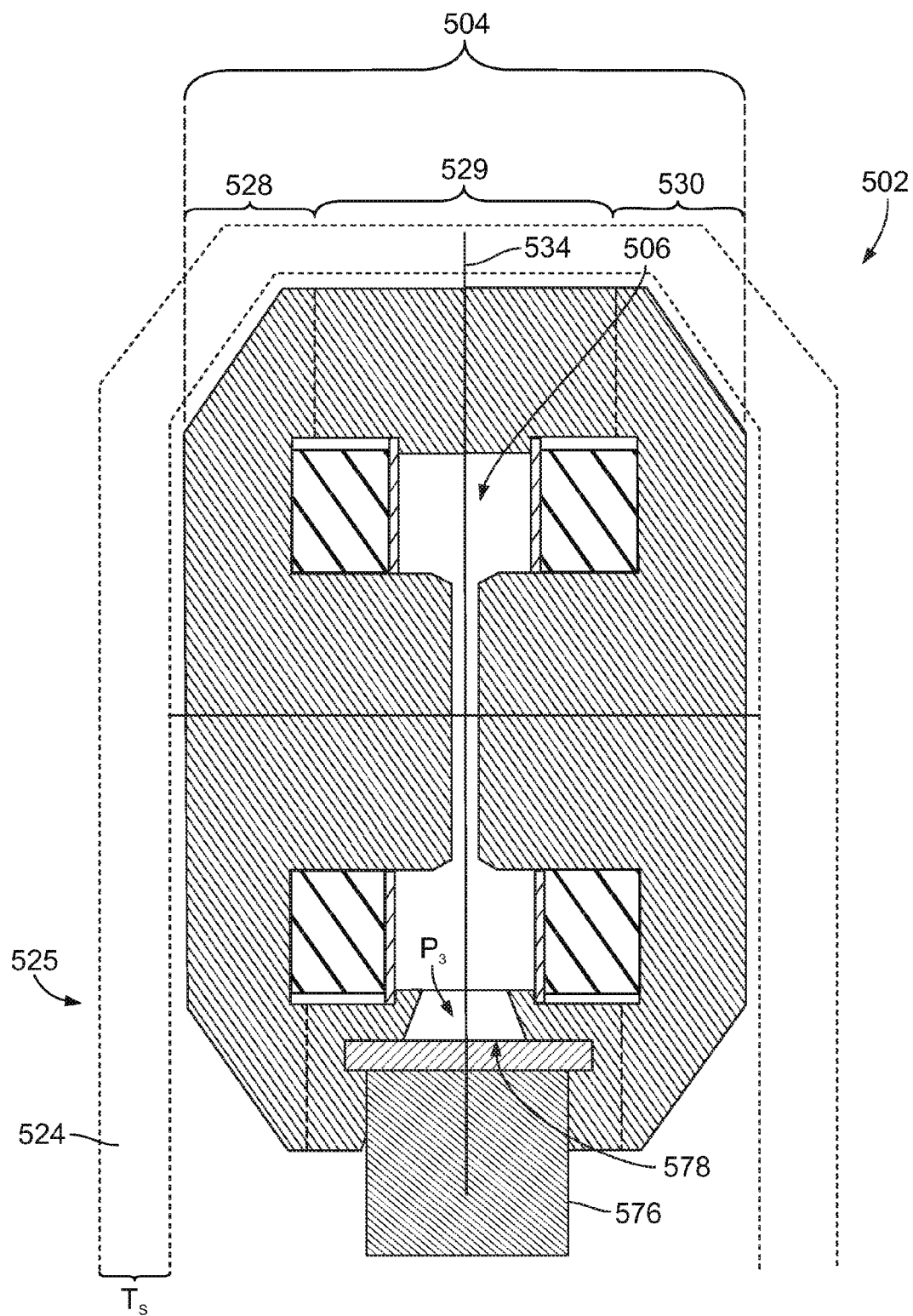
FIG. 10 is a side view of a cyclotron formed in accordance with another embodiment that may be used with the isotope production system shown in FIG. 8.

In some embodiments, the yoke sections 228 and 230 may be moveable toward and away from each other so that the acceleration chamber 206 may be accessed (e.g., for repair or maintenance). For example, the yoke sections 228 and 230 may be joined by a hinge (not shown) that extends alongside the yoke sections 228 and 230. Either or both of the yoke sections 228 and 230 may be opened by pivoting the corresponding yoke section(s) about an axis of the hinge. As another example, the yoke sections 228 and 230 may be separated from each other by laterally moving one of the yoke sections linearly away from the other. However, in alternative embodiments, the yoke sections 228 and 230 may be integrally formed or remain sealed together when the acceleration chamber 206 is accessed (e.g., through a hole or opening of the magnet yoke 202 that leads into the acceleration chamber 206). In alternative embodiments, the yoke body 204 may have sections that are not evenly divided and/or may include more than two sections. For example, the yoke body may have three sections as shown in FIG. 10 with respect to the magnet yoke 504.

The acceleration chamber 206 may have a shape that extends along and is substantially symmetrical about the midplane 232. For instance, the acceleration chamber 206 may be surrounded by an interior radial or wall surface 225 that extends around the central axis 236 such the acceleration chamber 206 is substantially disc-shaped. The acceleration chamber 206 may include inner and outer spatial regions 241 and 243. The inner spatial region 241 may be defined between the pole tops 252 and 254, and the outer spatial region 243 may be defined between the chamber walls 272 and 274. The spatial region 243 extends around the central axis 236 surrounding the spatial region 241. The orbit of the charged particles during operation of the cyclotron 200 may be within the spatial region 241. As such, the acceleration chamber 206 is at least partially defined widthwise by the pole tops 252 and 254 and the chamber walls 272 and 274. An outer periphery of the acceleration chamber 206 may be defined by the interior radial surface 225. The acceleration chamber 206 may also include passages that lead radially outward away from the spatial region 243, such as a passage that leads toward the vacuum pump 276 and the beam passage 314 (FIG. 2).

The exterior surface 205 defines an envelope 207 of the yoke body 204. The envelope 207 has a shape that is about equivalent to a general shape of the yoke body 204 defined by the exterior surface 205 without small cavities, cut-outs, or recesses. (For illustrative purposes only, the envelope 207 is shown in FIG. 5 as being slightly larger than the yoke body 204.) As shown in FIG. 5, a cross-section of the envelope 207 is an eight-sided polygon defined by the exterior radial surface 223, the side surfaces 209 and 211, and the corner surfaces 217 and 219. The yoke body 204 may form passages, cut-outs, recesses, cavities, and the like that allow component or devices to penetrate into the envelope 207. The shield-acceptance recess 262 (FIG. 4) and the PA cavity 282 are examples of such recesses and cavities.

Figure 6:
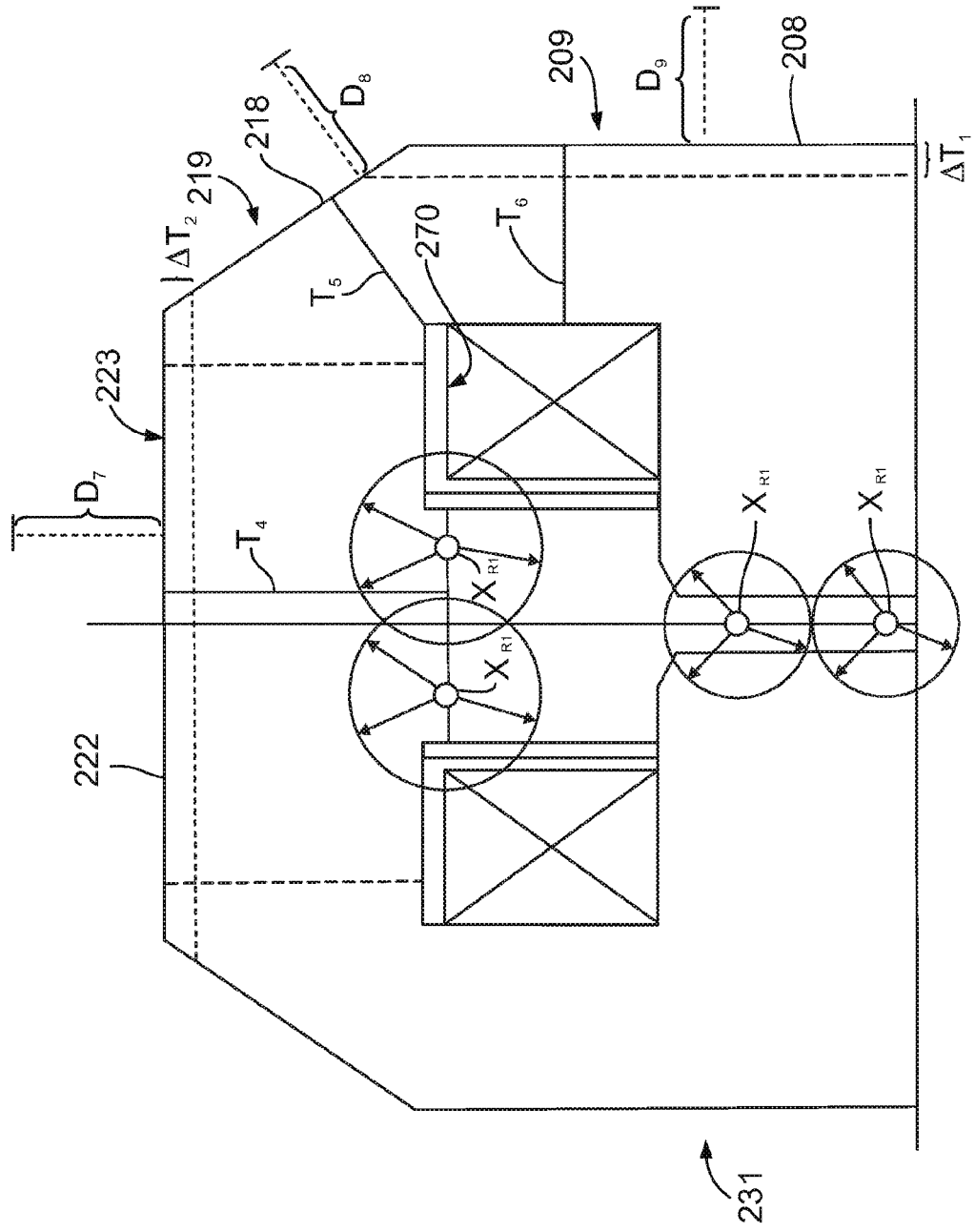
FIG. 6 is an enlarged side view of a portion of the cyclotron shown in FIG. 5.

FIG. 6 is a side view of the upper portion 231 illustrating radiation being emitted during operation of the cyclotron 200 (FIG. 3). The cyclotron 200 may be separately configured to attenuate radiation emitted from the acceleration chamber 206 (FIG. 5). However, the cyclotron 200 may also be configured to attenuate radiation and to reduce the strength of the stray fields as described in U.S. patent application Ser. No. 12/435,931, which is incorporated by reference in the entirety. As discussed above, one type of radiation is from neutron flux. In a particular embodiment, the cyclotron 200 is operated at a low energy such that radiation from the neutron flux does not exceed a predetermined amount outside of the yoke body. For example, the cyclotron may be operated to accelerate the particles to an energy level of approximately 9.6 MeV or less. More specifically, the cyclotron may be operated to accelerate the particles to an energy level of approximately 7.8 MeV or less.

The second type of radiation, gamma rays, is produced when neutrons or protons collide with the yoke body 204. FIG. 6 illustrates several points $X_{R1}$ where particles generally collide with the yoke body 204 when the cyclotron 200 is in operation. The gamma rays emit from the corresponding points $X_{R1}$ in an isotropic manner (i.e., away from the corresponding point $X_{R1}$ in a spherical manner). The dimensions of the yoke body 204 may be sized, to attenuate the radiation of the gamma rays. For example, FIG. 6 shows the thicknesses $T_4$, $T_5$, and $T_6$ that extend through a radial portion 222, a transition region 218, and a portion of the yoke body 204 that extends from a coil cavity 270 to the side 208, respectively. The thicknesses $T_4$, $T_5$, and $T_6$ may be sized so that the dose rate within a desired distance from the exterior surface 205 (or at the exterior surface 205) is below a predetermined amount. Distances $D_7$-$D_9$ represent predetermined distances away from the exterior surface 205 in which the radiation sustained is below a desired dose rate. Each distance $D_7$-$D_9$ from the exterior surface 205 may be a shortest distance to the exterior surface 507 from a point outside of the yoke body 204.

Accordingly, the thicknesses $T_4$, $T_5$, and $T_6$ may be sized so that the dose rate outside of the yoke body 204 does not exceed a desired amount within a desired distance when the target current operates at a predetermined current. By way of example, the thicknesses $T_4$, $T_5$, and $T_6$ may be sized so that the dose rate does not exceed 2 μSv/h at a distance of less than about 1 meter from the corresponding surface at a target current from about 20 to about 30 μA. Furthermore, the thicknesses $T_4$, $T_5$, and $T_6$ may be sized so that the dose rate does not exceed 2 μSv/h at a point along the corresponding surface (i.e., $D_4$, $D_5$, and $D_6$ equal approximately zero) at a target current from about 20 to about 30 μA. However, the dose rate may be directly proportional to the target current. For example, the dose rate may be 1 μSv/h at a point along the corresponding surface when the target current is 10-15 μA.

In one embodiment, the magnet yoke has a geometric center located within the acceleration chamber. An exterior boundary of the cyclotron has a dose rate of less than about 4 μSv/h at a distance of less than about 1 meter from the geometric center and an exterior boundary of the target system has a dose rate of less than about 4 μSv/h at a distance of less than about 1 meter from the target material. The target material experiences a beam current of between about 20 μA and 30 μA.

The dose rate may be determined by using known methods or devices. For example an ion chamber or Geiger Muller (GM) tube based gamma survey meter could be used to detect the gammas. The neutrons may be detected using a dedicated neutron monitor usually based on detectable gammas coming from the neutrons interacting with a suitable material (e.g., plastic) around an ion chamber or GM tube.

In accordance with one embodiment, the dimensions of the yoke body 204 are configured to limit or reduce magnetic stray fields around the yoke body 204 and to reduce the radiation emitted from the cyclotron 200. A maximum magnetic flow (B) that can be achieved by the cyclotron 200 with respect to the magnetic fields through the yoke body 204 may be based upon (or significantly determined by) the least cross-sectional area of the yoke body 204 found along the thickness $T_5$. As such, the size of other cross-sectional areas within the yoke body 204, such as cross-sectional areas associated with the thicknesses $T_4$ and $T_6$, may be determined based upon the cross-sectional area with the transition region 218. For example, in order to reduce the weight of the magnet yoke, conventional cyclotrons typically reduce the cross-sectional areas $T_4$ and $T_6$ until any further reduction would substantially affect the maximum magnetic flow (B) of the cyclotron.

However, the thicknesses $T_4$, $T_5$, and $T_6$ may be based upon not only a desired magnetic flow (B) through the yoke body 204 but also a desired attenuation of the radiation. As such, some portions of the yoke body 204 may have excess material with respect to an amount of material necessary to achieve a desired average magnetic flow (B) through the yoke body 204. For example, the cross-sectional area of the yoke body 204 associated with the thickness $T_6$ may have an excess thickness of material (indicated as $\Delta T_1$). The cross-sectional area of the yoke body 204 associated with the thickness $T_4$ may have an excess thickness of material (indicated as $\Delta T_2$). Accordingly, embodiments described herein may have a thickness, such as the thickness $T_5$, that is defined to maintain magnetic flow (B) below an upper limit and another thickness, such as the thicknesses $T_6$ and $T_4$, that is defined to attenuate the gamma rays that are emitted from within the acceleration chamber.

Furthermore, dimensions of the yoke body 204 may be based upon the type of particles used within the acceleration chamber and the type of material within the acceleration chamber 206 that the particles collide with. Furthermore, dimensions of the yoke body 204 may be based upon the material that comprises the yoke body. Also, in alternative embodiments, an outer shield may be used in conjunction with the dimensions of the yoke body 204 to attenuate both the magnetic stray fields and the radiation emitting from within the yoke body 204.

FIG. 7 is an enlarged side view of the target region 308. As shown, the target region 308 includes the first or inner shielding structure 320, a collimator 338, a target holder 342 that holds the target media within target locations 340A-340C, and a rotating mechanism 344 that movably couples the target holder 342 to the collimator 338 (or the beam passage 314). The particle beam 312 is directed along the beam passage 314 and is narrowed or focused by the collimator 338 before the particle beam 312 impinges or collides with the target material at the corresponding target location 340. The rotating mechanism 344 may be selectively controlled to move or rotate the holder 342 so that the target locations 340A-340C are moved with respect to the particle beam 312. More specifically, an operator of the IP system 300 (FIG. 2) may select a target material to make a desired radioisotope. The rotating mechanism 344 may then rotate about a pivot point 348 to move the target locations 340A-340C so that the desired target material collides with the particle beam 312. In alternative embodiments, the rotating mechanism 344 may rotate the holder 342 about the beam axis 330 (FIG. 2). Furthermore, although three target locations 340A-340C are shown, fewer or more target locations may be used.

As shown, the first shielding structure 320 immediately surrounds the target locations 340A-340C and is not located within the shield-acceptance cut-out 262. The first shielding structure 320 may consist essentially of lead (Pb) and be shaped to attenuate the prompt gamma radiation generated at the target location 340. In some embodiments, a space or void within the first shielding structure 320 is sized and shaped to allow the holder 342 to move into various positions. As such, a size and shape of the first shielding structure 320 may be determined by the space used by the holder 342 to move the target locations 340. Also shown, the first shielding structure 320 may have a thickness $T_7$. The thickness $T_7$ is configured to attenuate the prompt gamma radiation so that the exterior boundary 301 has less than a maximum dose rate. In such embodiments where the first shielding structure 320 immediately surrounds the target location(s) 340, the isotope production system 300 (FIG. 2) may use less lead (Pb) than conventional isotope production systems that have lead (Pb) surrounding most or all of the cyclotron and target system.

Figure 8:
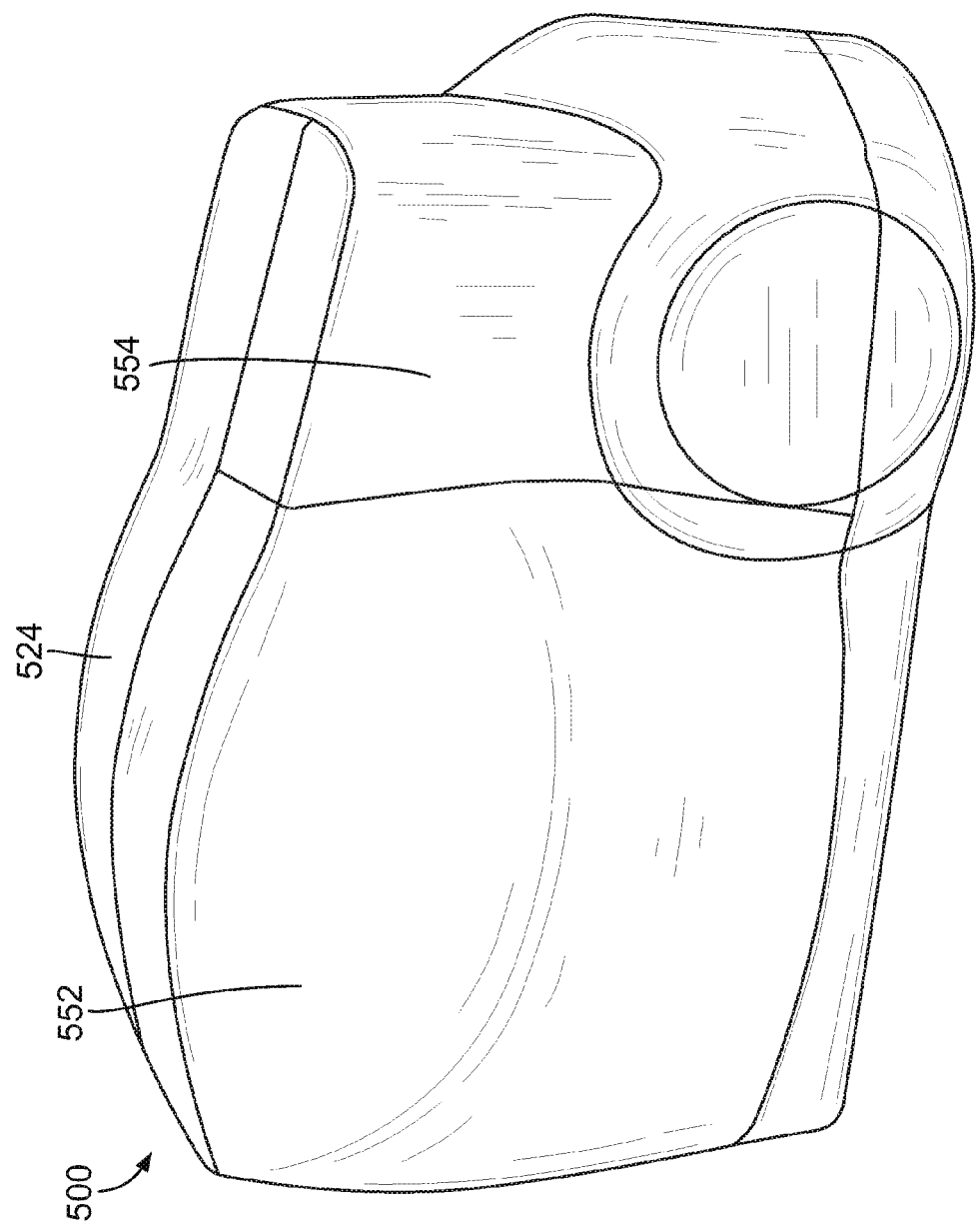
FIG. 8 is a perspective view of an isotope production system formed in accordance with one embodiment having a housing in a closed position.
Figure 9:
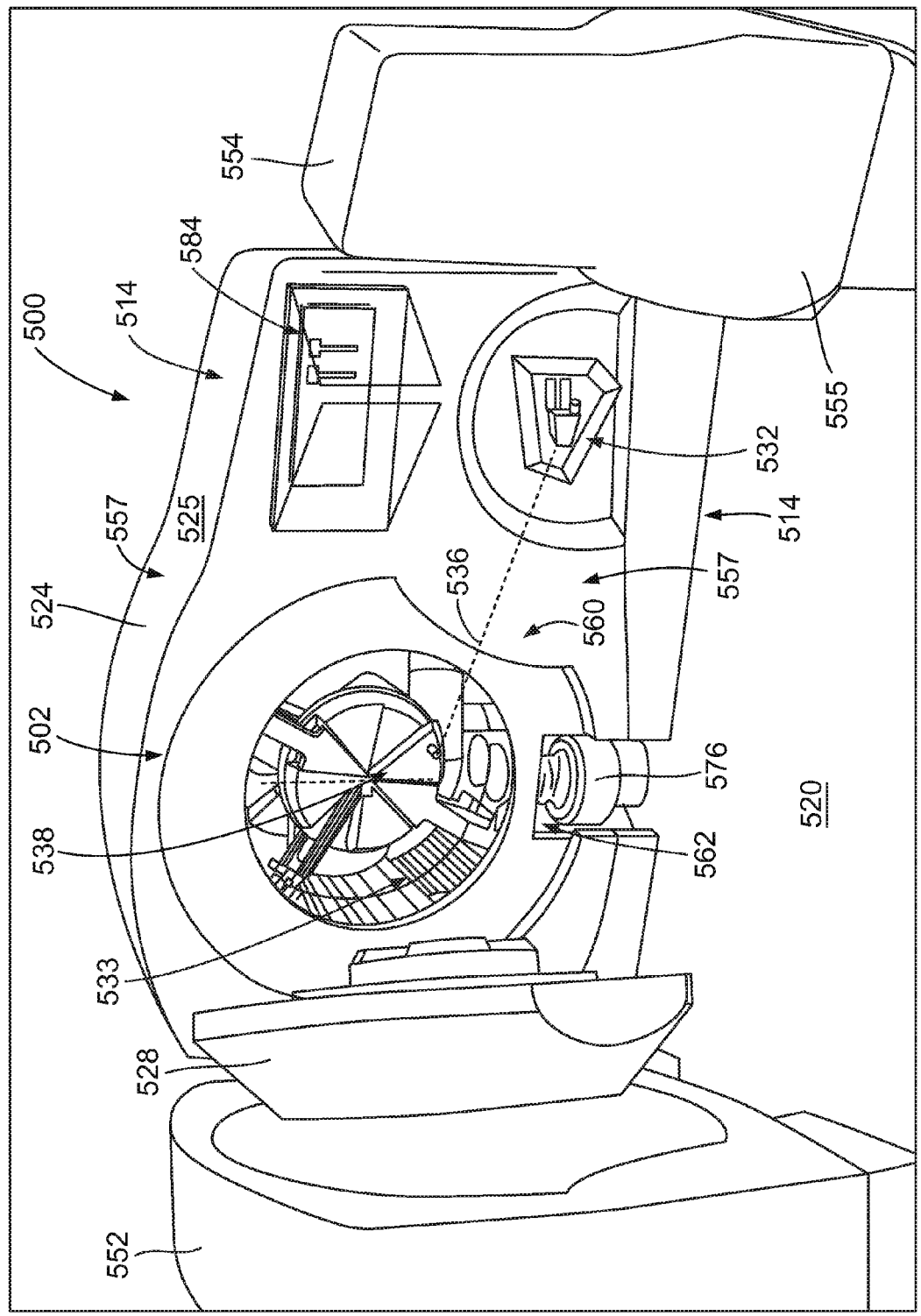
FIG. 9 is a perspective of the isotope production system of FIG. 8 when the housing is in an open position.

FIGS. 8 and 9 are perspective views of an isotope production (IP) system 500 formed in accordance with one embodiment while in a closed or operational position and an open or accessible position respectively. As shown, the IP system 500 may include a housing 524 that encloses a cyclotron 502 (FIG. 9) and a target system 514 (FIG. 9). With reference to FIG. 9, the IP system 500 is configured to be used within a hospital or clinical setting and may include similar components and systems as described with the IP system 100 (FIG. 1) and the IP system 300 (FIG. 2). The cyclotron 502 and target system 514 may manufacture radioisotopes for use with a patient. The cyclotron 502 defines an acceleration chamber 506 where charged particles move along a predetermined path when the cyclotron 502 is activated. When in use, the cyclotron 502 accelerates charged particles along a predetermined or desired beam path 536 and directs the particles toward a target region 532 of the target system 514. The beam path 536 (indicated as a hashed-line) extends from the acceleration chamber 506 into the target system 514.

FIG. 10 is a cross-section of the cyclotron 502. As shown, the cyclotron 502 has similar features and components as the cyclotron 200 (FIG. 2). However, the cyclotron 502 includes a magnet yoke 504 that may comprise three sections 528-530 sandwiched together. More specifically, the cyclotron 502 includes a ring section 529 that is located between yoke sections 528 and 530. When the ring and yoke sections 528-530 are stacked together as shown, the yoke sections 528 and 530 face each other across a mid-plane 534 and define the acceleration chamber 506 of the magnet yoke 504 therein. As shown, the ring section 529 may define a passage $P_3$ that leads to a port 578 of a vacuum pump 576. The vacuum pump 576 may be a fluidless pump and have similar features as described in U.S. patent application Ser. Nos. 12/435,931 and 12/435,949, which are incorporated by reference in the entirety. For example, the vacuum pump 576 may be a turbomolecular pump.

Also shown, the housing 524 may have a thickness $T_S$ and an exterior surface 525. The housing 524 may be fabricated from polyethylene (PE) and lead (Pb) and the thickness $T_S$ may be configured to attenuate neutron flux from the cyclotron 502. In other embodiments, the housing 524 is substantially free of lead (Pb). The exterior surface 525 may represent an exterior boundary of the isotope production system 500. In addition to the other dimensions of the magnet yoke 504, the housing 524 may be sized and shaped to achieve desired attenuation of radiation and a desired reduction in stray fields. For example, the dimensions of the magnet yoke 504 and the dimensions of the housing 524 (e.g., the thickness $T_S$) may be configured so that the dose rate does not exceed 2 μSv/h at a distance of less than about 1 meter from the exterior surface 525 and, more specifically, at a distance of 0 meters. Also, the magnet yoke 504 and the dimensions of the housing 524 may be sized and shaped such that the stray fields do not exceed 5 Gauss at a distance of 1 meter from the exterior surface 525 or, more specifically, at a distance of 0.2 meters.

Returning to FIG. 9, the housing 524 may provide access to the acceleration chamber 506 and the target region 532. For example, the housing 524 may include moveable partitions 552 and 554 that provide access to the acceleration chamber 506 and the target region 532, respectively. As shown in FIG. 9, both of the partitions 552 and 554 are in an open position. The partition 554 may be opened separately so that the target region and a user interface 584 of the target system 514 may be accessed without opening the partition 552. When closed, the partition 554 may cover the target region 532 and the user interface 584 of the target system 514. The partition 552 may cover the cyclotron 502 when closed.

The partition 554 may include a portion of a radiation shield, such as the radiation shield 306. The partition 554 may comprise a first section 555 of the radiation shield and a main body 557 of the IP system 500 may include a second section 557 of the radiation shield. Accordingly, when the partition 554 is closed, the radiation shield of the target system 514 may be comprised of the first and second sections 555 and 557 and may have similar dimensions and features as described above with respect to the radiation shield 306.

Also shown, the yoke section 528 of the cyclotron 502 may be moveable between open and closed positions. (FIG. 9 illustrates an open position and FIG. 10 illustrates a closed position.) The yoke section 528 may be attached to a hinge (not shown) that allows the yoke section 528 to swing open like a door or a lid and provide access to the acceleration chamber 506. The yoke section 530 (FIG. 10) may also be moveable between open and closed positions or may be sealed to or integrally formed with the ring section 529 (FIG. 10).

Furthermore, the vacuum pump 576 may be located within a pump-acceptance chamber 562 of the ring section 529 and the housing 524. The pump-acceptance chamber 562 may be accessed when the partition 552 is in the open position. As shown, the vacuum pump 576 is located below a central region 538 of the acceleration chamber 506 such that a vertical axis extending, through a center of the port 578 from a horizontal support 520 would intersect the central region 538. Also shown, the yoke section 528 and ring section 529 may have a shield-acceptance recess 560. The beam path 536 extends through the shield-acceptance recess 560 to the target region 532.

Figure 11:
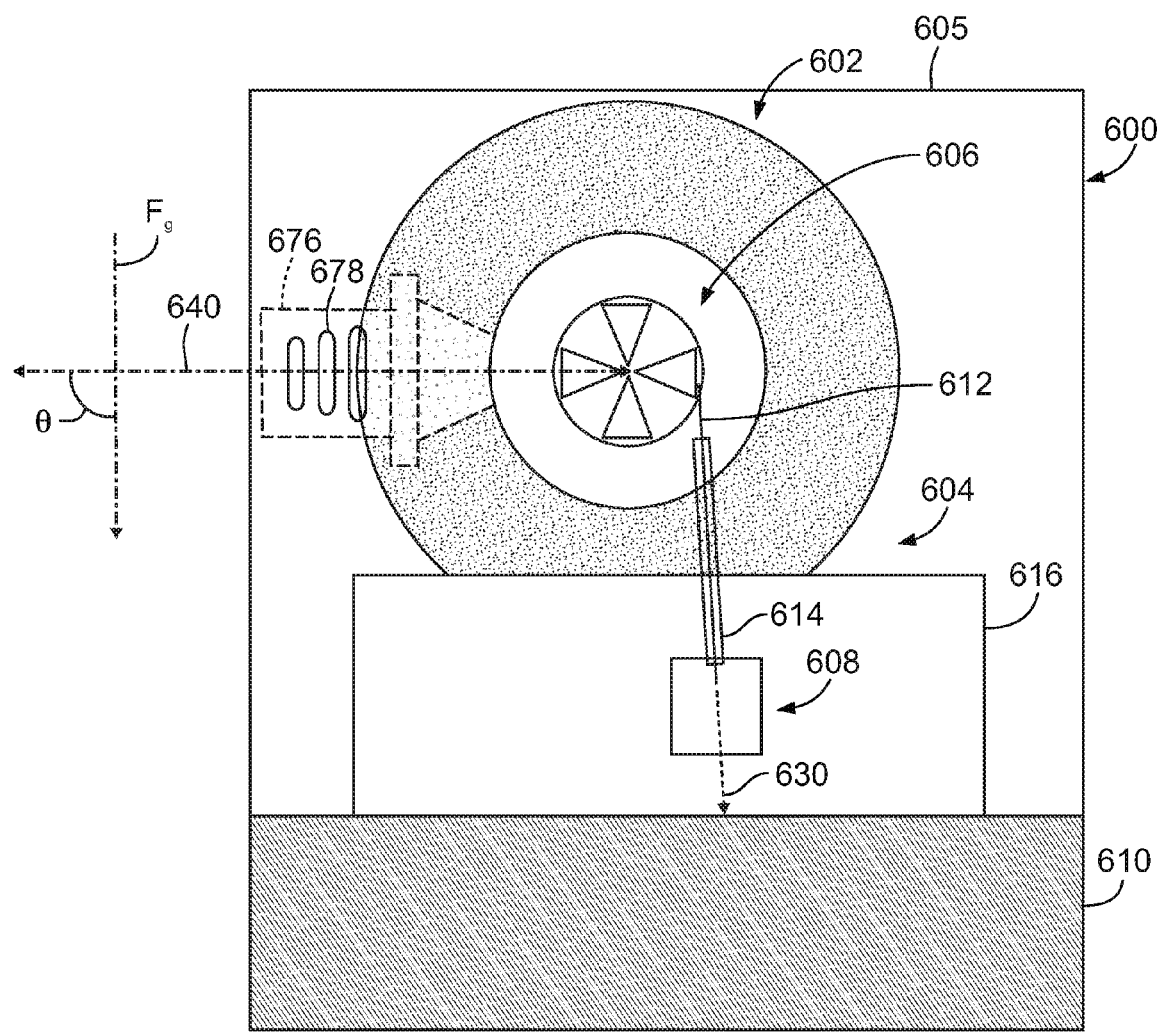
FIG. 11 is a schematic side view of an isotope production system formed in accordance with an alternative embodiment.

FIG. 11 is a schematic side view of an isotope production (IP) system 600 formed in accordance with an alternative embodiment. The IP system 600 includes a cyclotron 602 and a target system 604 that may have similar features as the cyclotrons and target systems described above. The IP system 600 may be supported by a platform 610 and be enclosed within a housing 605. As shown, the cyclotron 602 is configured to provide a particle beam 612 that extends along a beam passage 614 from an acceleration chamber 606 of the cyclotron 602 to a target region 608 of the target system 604. As shown, the cyclotron 602 may rest upon and be supported by a radiation shield 616 of the target system 604. The particle beam 612 and the beam passage 614 may extend along a beam axis 630 such that the beam axis 630 intersects the platform 610.

The IP system 600 may also include a vacuum pump 676. Conventional cyclotrons and isotope production systems have vacuum pumps (e.g., diffusion pump) that use a working fluid (e.g., oil) to generate the required pressure for evacuating the acceleration chamber. However, the vacuum pump 676 in the cyclotron 602 may be a fluidless pump (e.g., turbomolecular pump) that is fluidically coupled to the acceleration chamber 606 of the cyclotron 602. The vacuum pump 676 may be oriented along a longitudinal axis 640 that forms an angle θ with respect to a gravitational force direction $F_G$. The angle θ may be, as shown, approximately 90 degrees. However, in alternative embodiments, the angle θ may be any angle greater than 10 degrees with respect to the gravitational force $F_G$. By way of one example, the vacuum pump 676 may be a turbomolecular pump having a fan 678 that rotates about the longitudinal axis 640. Accordingly, in such embodiments where the vacuum pump 676 is a fluidless vacuum pump, the vacuum pump 676 may have different orientations without concern for oil or another fluid spilling into the acceleration chamber 606.

Figure 12:
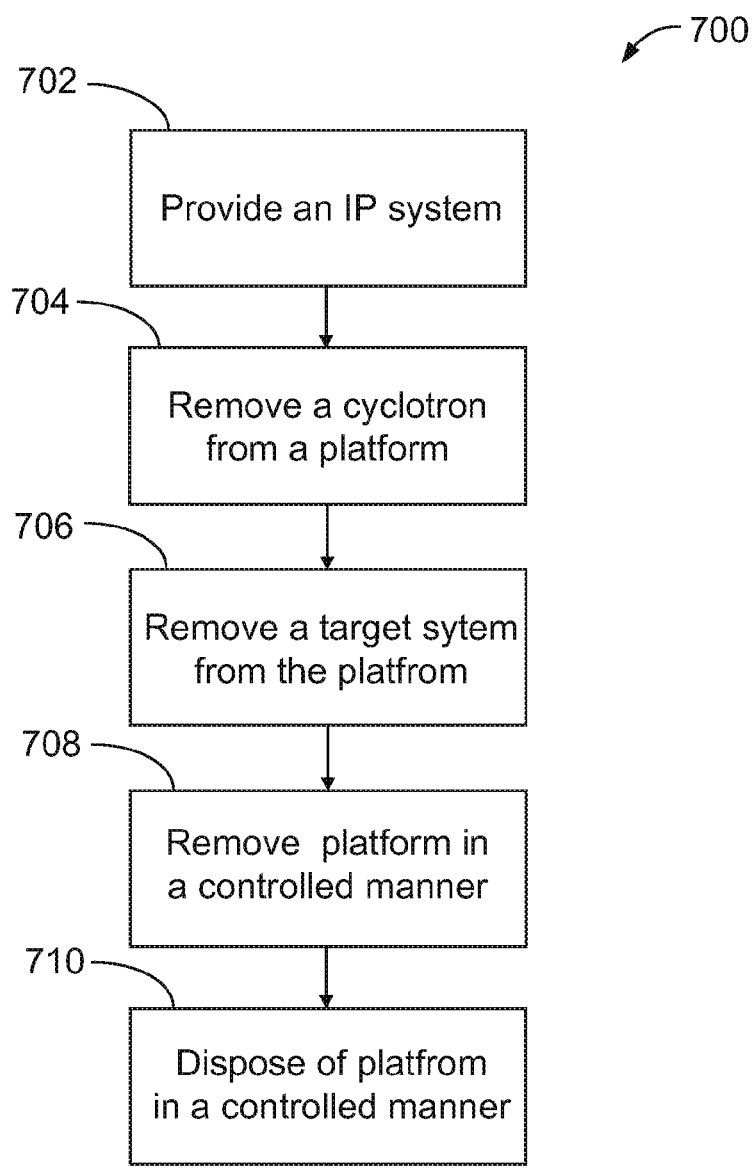
FIG. 12 is a block diagram of a method for decommissioning an isotope production system in accordance with one embodiment.

FIG. 12 shows a method 700 for decommissioning an isotope production (IP) system, such as the IP systems 100, 300, 500, and 600 described above. The method 700 includes providing an IP system at 702 that includes a cyclotron and a target system. The cyclotron and the target system may be supported on a platform. The platform, in turn, may be supported by a floor of a room in a facility. As described above, the cyclotron may be configured to direct a particle beam along a beam passage toward the target system. The target system may be located on the platform adjacent to the magnet yoke. Furthermore, the beam passage may extend along a beam axis that intersects the platform. The beam passage may be directed toward the platform such that accumulated radioactivity in walls or ceilings of the room do not exceed a threshold level. The method 700 also includes at 704 removing the cyclotron and, at 706, removing the target system from the platform.

The method 700 also includes at 708 removing the platform from the floor of the facility in a controlled manner (i.e., in accordance with established safety standards with respect to handling radioactive material). The method 700 also includes at 710 disposing of the platform in a controlled manner. In some embodiments, the method 700 does not include removing an original support structure from the room. The original support structure may be at least a portion of one of a ceiling, the floor, and a wall.

Embodiments described herein are not intended to be limited to generating radioisotopes for medical uses, but may also generate other isotopes and use other target materials. Furthermore, in the illustrated embodiment the cyclotrons are vertically-oriented isochronous cyclotrons. However, alternative embodiments may include other kinds of cyclotrons and other orientations (e.g., horizontal). Furthermore, embodiments described herein include methods of manufacturing the IP systems, target systems, and cyclotrons as described above.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing, the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An isotope production system comprising:
a cyclotron including a magnet yoke that surrounds an acceleration chamber, the cyclotron configured to direct a charged-particle beam from the acceleration chamber through the magnet yoke; and
a target system located adjacent to the magnet yoke, the target system configured to hold a target material at a target location, the target location being outside of the magnet yoke such that the charged-particle beam is incident upon the target material outside of the magnet yoke, the target system including a radiation shield that encloses the target location and is configured to attenuate neutrons that are emitted from the target material; and
a beam passage extending from the acceleration chamber through the magnet yoke and the radiation shield to the target location, the beam passage being at least partially formed by the magnet yoke and the radiation shield of the target system;
wherein the magnet yoke has an exterior surface that forms a shield-acceptance cut-out, the beam passage extending through the magnet yoke from the acceleration chamber and into the shield-acceptance cut-out, wherein a portion of the radiation shield is shaped to fit within the shield-acceptance cut-out of the magnet yoke, the portion of the radiation shield extending out of the shield-acceptance cut-out toward the target location.

2. The isotope production system in accordance with claim 1 wherein the beam passage has a length measured from the target location to an interior surface of the magnet yoke that defines the acceleration chamber, the beam passage being linear along the length, wherein the length is between 0.5 and 1.5 meters.

3. The isotope production system in accordance with claim 1 wherein an exterior surface of the radiation shield directly abuts an exterior surface of the magnet yoke.

4. The isotope production system in accordance with claim 1 further comprising a common housing that contains the cyclotron and the target system, the housing including first and second moveable partitions that are configured to provide access to the acceleration chamber and the target system, respectively, when the first and second moveable partitions are in respective open positions, the second movable partition including a section of the radiation shield.

5. The isotope production system in accordance with claim 4 wherein the housing comprises polyethylene and lead.

6. The isotope production system in accordance with claim 1 wherein the radiation shield comprises a material composition configured to attenuate radiation emitting from the target material and the magnet yoke comprises a different material composition configured to attenuate radiation emitting from the acceleration chamber.

7. The isotope production system in accordance with claim 1 wherein the radiation shield has a shape that substantially conforms to a shape of the shield-acceptance cut-out.

8. The isotope production system in accordance with claim 1 wherein the radiation shield comprises a first shielding structure that encloses a target region having the target location, the first shielding structure comprising a first material composition that is configured to attenuate gamma rays that emit from the target material.

9. An isotope production system comprising:
a cyclotron including a magnet yoke that surrounds an acceleration chamber, the cyclotron configured to direct a charged-particle beam from the acceleration chamber through the magnet yoke;
a target system located adjacent to the magnet yoke, the target system configured to hold a target material at a target location, the target location being outside of the magnet yoke such that the charged-particle beam is incident upon the target material outside of the magnet yoke, the target system including a radiation shield that encloses the target location and is configured to attenuate neutrons that are emitted from the target material; and
a beam passage extending from the acceleration chamber through the magnet yoke and the radiation shield to the target location, the beam passage being at least partially formed by the magnet yoke and the radiation shield of the target system;
wherein the radiation shield comprises a first shielding structure that encloses a target region having the target location, the first shielding structure comprising a first material composition that is configured to attenuate gamma rays that emit from the target material; and
wherein the radiation shield further comprises a second shielding structure that encloses the first shielding structure, the second shielding structure comprising a second material composition that is configured to attenuate neutrons emitting from the target material, the first and second material compositions being different.

10. The isotope production system in accordance with claim 1 wherein the magnet yoke has a geometric center located within the acceleration chamber, wherein an exterior boundary of the cyclotron has a dose rate of less than about 4 μSv/h at a distance of less than about 1 meter from the geometric center and an exterior boundary of the target system has a dose rate of less than about 4 μSv/h at a distance of less than about 1 meter from the target material, wherein the target material experiences a beam current of between about 20 μA and 30 μA and the cyclotron is configured to accelerate $^1H^-$ ions to an energy level of approximately 9.6 MeV or less.

11. An isotope production system comprising:
a cyclotron supported by a platform, the cyclotron including a magnet yoke that surrounds an acceleration chamber, the cyclotron configured to direct a charged-particle beam from the acceleration chamber through the magnet yoke; and
a target system located on the platform and adjacent to the magnet yoke, the target system including a radiation shield that has a target region configured to hold a target material at a target location, the target location being outside of the magnet yoke such that the charged-particle beam is incident upon the target material outside of the magnet yoke;
a beam passage extending from the acceleration chamber to the target location, the beam passage being at least partially formed by the magnet yoke and the target system, the beam passage extending along a beam axis that intersects the platform; and
a housing that encloses the cyclotron and the target system, the housing including first and second moveable partitions that are configured to provide access to the acceleration chamber and the target region, respectively, when the first and second moveable partitions are in open positions, the second movable partition including a section of the radiation shield.

12. The isotope production system in accordance with claim 11 wherein the radiation shield encloses the target location and is configured to attenuate gamma rays and neutrons that emit from the target material.

13. The isotope production system in accordance with claim 12 wherein the radiation shield has a target region including a space where the target location is held, the radiation shield including an exterior surface and a varying radial thickness that is measured from the target region to the exterior surface of the radiation shield, the radiation shield being supported by the platform, wherein the radiation shield includes first and second portions, the radial thickness of the first portion extending from the target region to the platform in a gravitational force direction, the radial thickness of the second portion extending from the target region away from the platform in a direction that is opposite the gravitational force direction, the radial thickness of the first portion being less than the radial thickness of the second portion.

14. The isotope production system in accordance with claim 12 wherein the radiation shield has an exterior surface that abuts an exterior surface of the magnet yoke.

15. The isotope production system in accordance with claim 11 wherein the beam passage is substantially linear from the acceleration chamber to the target location.

16. The isotope production system in accordance with claim 11 further comprising a turbomolecular pump that is fluidicly coupled to the acceleration chamber of the magnet yoke, the turbomolecular pump being oriented along a longitudinal axis that forms an angle with respect to a gravitational force direction, the angle being greater than 10 degrees.

17. The isotope production system in accordance with claim 1 wherein the radiation shield completely surrounds the target location except for the beam passage.

18. An isotope production system comprising:
a cyclotron including a magnet yoke that surrounds an acceleration chamber, the cyclotron configured to direct a charged-particle beam from the acceleration chamber through the magnet yoke; and
a target system located adjacent to the magnet yoke, the target system configured to hold a target material at a target location, the target location being outside of the magnet yoke such that the charged-particle beam is incident upon the target material outside of the magnet yoke, the target system including a radiation shield that encloses the target location and is configured to attenuate neutrons that are emitted from the target material; and
a beam passage extending from the acceleration chamber through the magnet yoke and the radiation shield to the target location, the beam passage being at least partially formed by the magnet yoke and the radiation shield of the target system;
wherein the radiation shield has a target region including a space where the target location is held, the radiation shield including an exterior surface and a varying radial thickness that is measured from the target region to the exterior surface of the radiation shield, wherein the radiation shield includes first and second portions, the radial thickness of the first portion extending from the target region to a platform in a gravitational force direction, the radial thickness of the second portion extending from the target region away from the platform in a direction that is opposite the gravitational force direction, the radial thickness of the first portion being less than the radial thickness of the second portion.

19. The isotope production system in accordance with claim 18 wherein the radiation shield includes first and second shielding structures, the first shielding structure surrounding the target location such that the first shielding structure encloses the target location, the second shielding structure surrounding the first shielding structure such that the second shielding structure encloses the first shielding structure, the second shielding structure including the exterior surface of the radiation shield.

20. The isotope production system in accordance with claim 1 wherein the radiation shield includes first and second shielding structures, the first shielding structure surrounding the target location such that the first shielding structure encloses the target location, the second shielding structure surrounding the first shielding structure such that the second shielding structure encloses the first shielding structure, the second shielding structure including the portion of the radiation shield that extends out of the shield-acceptance cut-out toward the target location.

21. The isotope production system in accordance with claim 20 wherein the first shielding structure consists essentially of lead and the second shielding structure comprises polyethylene.

22. The isotope production system in accordance with claim 20 wherein the first shielding structure is not located within the shield-acceptance cut-out.

23. The isotope production system in accordance with claim 11 wherein the radiation shield includes first and second shielding structures, the first shielding structure surrounding the target location such that the first shielding structure encloses the target location, the second shielding structure surrounding the first shielding structure such that the second shielding structure encloses the first shielding structure, wherein the beam axis extends through the target location and intersects each of the first and second shielding structures after the target location.

* * * * *